(12) United States Patent
Kagan et al.

(10) Patent No.: US 7,860,857 B2
(45) Date of Patent: Dec. 28, 2010

(54) DIGITAL DATA PROCESSING APPARATUS AND METHODS FOR IMPROVING PLANT PERFORMANCE

(75) Inventors: Harris D. Kagan, Foxboro, MA (US); David Hardin, Franklin, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 11/731,629

(22) Filed: Mar. 30, 2007

(65) Prior Publication Data

US 2007/0233664 A1    Oct. 4, 2007

Related U.S. Application Data

(60) Provisional application No. 60/788,373, filed on Mar. 30, 2006, provisional application No. 60/856,572, filed on Nov. 3, 2006.

(51) Int. Cl.
*G06F 17/30* (2006.01)
(52) U.S. Cl. .................................. 707/710; 707/711
(58) Field of Classification Search .................. 707/3, 707/710, 711
See application file for complete search history.

(56) References Cited

U.S. PATENT DOCUMENTS

| | | |
|---|---|---|
| 3,096,434 A | 7/1963 | King |
| 3,404,264 A | 10/1968 | Kugler |
| 3,665,172 A | 5/1972 | Spaargaren et al. |
| 3,701,280 A | 10/1972 | Stroman |
| 3,802,590 A | 4/1974 | Culver |
| 3,810,119 A | 5/1974 | Zieve et al. |
| 3,825,905 A | 7/1974 | Allen, Jr. |
| 3,959,772 A | 5/1976 | Wakasa et al. |

(Continued)

FOREIGN PATENT DOCUMENTS

EP    0411869    2/1991

(Continued)

OTHER PUBLICATIONS

Eirinaki et al., "Web mining for web personalization", ACM Transactions on Internet Technology vol. 3, Issue 1 (Feb. 2003), p. 1-27 [online]. Rerieved from the Internet:<URL: http://portal.acm.org/ft$_{13}$ gateway.cfm?id=643478&type=pdf&coll=ACM&dl= ACM&CFID=93294188&CFTOKEN=17685386>.*

(Continued)

*Primary Examiner*—Jean B. Fleurantin
*Assistant Examiner*—Dennis Myint
(74) *Attorney, Agent, or Firm*—Nutter McClennen & Fish LLP; David J. Powsner

(57) ABSTRACT

The invention provides, in one aspect, human machine interface (HMI) methods and apparatus that permit users to search and/or view plant and other real-time process automation data in a manner similar to that with which they search and/or view pages on the Internet (web). Related aspects of the invention provide such methods and apparatus as permit users to search and/or view such real-time process automation data concurrently with such Internet web pages. Further related aspects of the invention provide such methods and apparatus as permit users to search and/or view such real-time process automation data concurrently with business data maintained in pages on an enterprise network (e.g., a LAN, WAN or otherwise).

36 Claims, 9 Drawing Sheets

U.S. PATENT DOCUMENTS

| | | |
|---|---|---|
| 4,006,464 A | 2/1977 | Landell |
| RE29,383 E | 9/1977 | Gallatin et al. |
| 4,058,975 A | 11/1977 | Gilbert et al. |
| 4,096,566 A | 6/1978 | Borie et al. |
| 4,276,593 A | 6/1981 | Hansen |
| 4,302,820 A | 11/1981 | Struger et al. |
| 4,312,068 A | 1/1982 | Goss et al. |
| 4,323,966 A | 4/1982 | Whiteside et al. |
| 4,347,563 A | 8/1982 | Paredes et al. |
| 4,351,023 A | 9/1982 | Richer |
| 4,377,000 A | 3/1983 | Staab |
| 4,410,942 A | 10/1983 | Milligan et al. |
| 4,413,314 A | 11/1983 | Slater et al. |
| 4,423,486 A | 12/1983 | Berner |
| 4,428,044 A | 1/1984 | Liron |
| 4,435,762 A | 3/1984 | Milligan et al. |
| 4,443,861 A | 4/1984 | Slater |
| 4,456,997 A | 6/1984 | Spitza et al. |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,530,234 A | 7/1985 | Cullick et al. |
| 4,609,995 A | 9/1986 | Hasebe et al. |
| 4,615,001 A | 9/1986 | Hudgins, Jr. |
| 4,628,437 A | 12/1986 | Poschmann et al. |
| 4,633,217 A | 12/1986 | Akano et al. |
| 4,639,852 A | 1/1987 | Motomiya et al. |
| 4,641,269 A | 2/1987 | Japenga et al. |
| 4,641,276 A | 2/1987 | Dunki-Jacobs |
| 4,648,064 A | 3/1987 | Morley |
| 4,649,479 A | 3/1987 | Advani et al. |
| 4,663,704 A | 5/1987 | Jones et al. |
| 4,672,530 A | 6/1987 | Schuss |
| 4,675,812 A | 6/1987 | Capowski et al. |
| 4,682,158 A | 7/1987 | Ito et al. |
| 4,682,304 A | 7/1987 | Tierney |
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,704,676 A | 11/1987 | Flanagan et al. |
| 4,709,325 A | 11/1987 | Yajima et al. |
| 4,719,593 A | 1/1988 | Threewitt et al. |
| 4,727,477 A | 2/1988 | Gavril |
| 4,733,366 A | 3/1988 | Deyesso et al. |
| 4,740,955 A | 4/1988 | Litterer et al. |
| 4,742,349 A | 5/1988 | Miesterfeld et al. |
| 4,750,109 A | 6/1988 | Kita et al. |
| 4,790,762 A | 12/1988 | Harms et al. |
| 4,805,107 A | 2/1989 | Kieckhafer et al. |
| 4,806,905 A | 2/1989 | McGowan, III et al. |
| 4,816,996 A | 3/1989 | Hill et al. |
| 4,817,094 A | 3/1989 | Lebizay et al. |
| 4,872,106 A | 10/1989 | Slater |
| 4,896,290 A | 1/1990 | Rhodes et al. |
| 4,897,777 A | 1/1990 | Janke et al. |
| RE33,162 E | 2/1990 | Yoshida et al. |
| 4,910,658 A | 3/1990 | Dudash et al. |
| 4,910,691 A | 3/1990 | Skeirik |
| 4,918,690 A | 4/1990 | Markkula, Jr. et al. |
| 4,926,158 A | 5/1990 | Zeigler |
| 4,934,196 A | 6/1990 | Romano |
| 4,958,277 A | 9/1990 | Hill et al. |
| 4,959,774 A | 9/1990 | Davis |
| 4,965,717 A | 10/1990 | Cutts, Jr. et al. |
| 4,965,742 A | 10/1990 | Skeirik |
| 4,965,880 A | 10/1990 | Petitjean et al. |
| 4,991,076 A | 2/1991 | Zifferer et al. |
| 4,991,170 A | 2/1991 | Kem |
| 5,008,805 A | 4/1991 | Fiebig et al. |
| 5,050,165 A | 9/1991 | Yoshioka et al. |
| 5,068,778 A | 11/1991 | Kosem et al. |
| 5,089,927 A | 2/1992 | Bulan et al. |
| 5,089,974 A | 2/1992 | Demeyer et al. |
| 5,109,692 A | 5/1992 | Fitzgerald |
| 5,121,318 A | 6/1992 | Lipner et al. |
| 5,122,948 A | 6/1992 | Zapolin |
| 5,124,908 A | 6/1992 | Broadbent |
| 5,129,087 A | 7/1992 | Will |
| 5,131,092 A | 7/1992 | Sackmann et al. |
| 5,134,574 A | 7/1992 | Beaverstock et al. |
| 5,136,704 A | 8/1992 | Danielsen et al. |
| 5,138,708 A | 8/1992 | Vosbury |
| 5,140,677 A | 8/1992 | Fleming et al. |
| 5,146,589 A | 9/1992 | Peet, Jr. et al. |
| 5,150,289 A | 9/1992 | Badavas |
| 5,151,978 A | 9/1992 | Bronikowski et al. |
| 5,151,981 A | 9/1992 | Westcott et al. |
| 5,159,673 A | 10/1992 | Sackmann et al. |
| 5,162,986 A | 11/1992 | Graber et al. |
| 5,163,055 A | 11/1992 | Lee et al. |
| 5,164,894 A | 11/1992 | Cunningham-Reid et al. |
| 5,166,685 A | 11/1992 | Campbell, Jr. et al. |
| 5,168,276 A | 12/1992 | Huston et al. |
| 5,168,441 A | 12/1992 | Onarheim et al. |
| 5,175,698 A | 12/1992 | Barbanell |
| 5,175,829 A | 12/1992 | Stumpf et al. |
| 5,181,978 A | 1/1993 | Ochiai et al. |
| 5,193,175 A | 3/1993 | Cutts, Jr. et al. |
| 5,202,961 A | 4/1993 | Mills et al. |
| 5,212,784 A | 5/1993 | Sparks |
| 5,233,615 A | 8/1993 | Goetz |
| 5,245,704 A | 9/1993 | Weber et al. |
| 5,251,125 A | 10/1993 | Karnowski et al. |
| 5,255,367 A | 10/1993 | Bruckert et al. |
| 5,258,999 A | 11/1993 | Wernimont et al. |
| 5,271,013 A | 12/1993 | Gleeson |
| 5,276,901 A | 1/1994 | Howell et al. |
| 5,283,729 A | 2/1994 | Lloyd |
| 5,289,365 A | 2/1994 | Caldwell et al. |
| 5,291,390 A | 3/1994 | Satou et al. |
| 5,295,258 A | 3/1994 | Jewett et al. |
| 5,295,263 A | 3/1994 | Kojima et al. |
| 5,297,143 A | 3/1994 | Fridrich et al. |
| 5,301,346 A | 4/1994 | Notarianni et al. |
| 5,302,952 A | 4/1994 | Campbell, Jr. et al. |
| 5,303,227 A | 4/1994 | Herold et al. |
| 5,303,375 A | 4/1994 | Collins et al. |
| 5,303,392 A | 4/1994 | Carney et al. |
| 5,307,346 A | 4/1994 | Fieldhouse et al. |
| 5,307,372 A | 4/1994 | Sawyer et al. |
| 5,307,463 A | 4/1994 | Hyatt et al. |
| 5,309,556 A | 5/1994 | Sismilich |
| 5,310,998 A | 5/1994 | Okuno et al. |
| 5,317,726 A | 5/1994 | Horst |
| 5,325,339 A | 6/1994 | Yost et al. |
| 5,327,144 A | 7/1994 | Stilp et al. |
| 5,335,186 A | 8/1994 | Tarrant |
| 5,335,221 A | 8/1994 | Snowbarger et al. |
| 5,339,362 A | 8/1994 | Harris |
| 5,339,680 A | 8/1994 | Bronkal et al. |
| 5,347,181 A | 9/1994 | Ashby et al. |
| 5,349,343 A | 9/1994 | Oliver |
| 5,352,033 A | 10/1994 | Gresham et al. |
| 5,359,721 A | 10/1994 | Kempf et al. |
| 5,367,640 A | 11/1994 | Hamilton et al. |
| 5,371,895 A | 12/1994 | Bristol |
| 5,377,315 A | 12/1994 | Leggett et al. |
| 5,381,529 A | 1/1995 | Matsushima et al. |
| 5,384,910 A | 1/1995 | Torres |
| 5,386,373 A | 1/1995 | Keeler et al. |
| 5,386,417 A | 1/1995 | Daugherty et al. |
| 5,390,321 A | 2/1995 | Proesel |

| | | | | | |
|---|---|---|---|---|---|
| 5,392,280 A | 2/1995 | Zheng | 5,544,008 A | 8/1996 | Dimmick et al. |
| 5,392,389 A | 2/1995 | Fleming | 5,544,321 A | 8/1996 | Theimer et al. |
| 5,394,522 A | 2/1995 | Sanchez-Frank et al. | 5,548,528 A | 8/1996 | Keeler et al. |
| 5,398,331 A | 3/1995 | Huang et al. | 5,549,137 A | 8/1996 | Lenz et al. |
| 5,400,140 A | 3/1995 | Johnston | 5,550,980 A | 8/1996 | Pascucci et al. |
| 5,405,779 A | 4/1995 | McCabe et al. | 5,551,047 A | 8/1996 | Mori et al. |
| 5,408,603 A | 4/1995 | Van de Lavoir et al. | 5,555,213 A | 9/1996 | DeLong |
| 5,410,492 A | 4/1995 | Gross et al. | 5,555,437 A | 9/1996 | Packer |
| 5,410,717 A | 4/1995 | Floro | 5,555,510 A | 9/1996 | Verseput et al. |
| 5,420,977 A | 5/1995 | Sztipanovits et al. | 5,559,691 A | 9/1996 | Monta et al. |
| 5,421,017 A | 5/1995 | Scholz et al. | 5,559,963 A | 9/1996 | Gregg et al. |
| 5,426,732 A | 6/1995 | Boies et al. | 5,561,770 A | 10/1996 | de Bruijn et al. |
| 5,428,734 A | 6/1995 | Haynes et al. | 5,563,400 A | 10/1996 | Le Roux et al. |
| 5,428,769 A | 6/1995 | Glaser et al. | 5,564,055 A | 10/1996 | Asnaashari et al. |
| 5,428,781 A | 6/1995 | Duault et al. | 5,566,320 A | 10/1996 | Hubert et al. |
| 5,432,711 A | 7/1995 | Jackson et al. | 5,568,378 A | 10/1996 | Wojsznis |
| 5,434,952 A | 7/1995 | Yen et al. | 5,570,300 A | 10/1996 | Henry et al. |
| 5,434,997 A | 7/1995 | Landry et al. | 5,572,643 A | 11/1996 | Judson |
| 5,437,007 A | 7/1995 | Bailey et al. | 5,572,673 A | 11/1996 | Shurts |
| 5,440,237 A | 8/1995 | Brown et al. | 5,576,946 A | 11/1996 | Bender et al. |
| 5,442,639 A | 8/1995 | Crowder et al. | 5,579,220 A | 11/1996 | Barthel et al. |
| 5,442,791 A | 8/1995 | Wrabetz et al. | 5,579,487 A | 11/1996 | Meyerson et al. |
| 5,444,851 A | 8/1995 | Woest | 5,581,760 A | 12/1996 | Atkinson et al. |
| 5,444,861 A | 8/1995 | Adamec et al. | 5,586,066 A | 12/1996 | White et al. |
| 5,450,403 A | 9/1995 | Ichii et al. | 5,586,112 A | 12/1996 | Tabata et al. |
| 5,450,425 A | 9/1995 | Gunn et al. | 5,586,156 A | 12/1996 | Gaubatz |
| 5,450,764 A | 9/1995 | Johnston et al. | 5,586,329 A | 12/1996 | Knudsen et al. |
| 5,451,923 A | 9/1995 | Seberger et al. | 5,586,330 A | 12/1996 | Knudsen et al. |
| 5,451,939 A | 9/1995 | Price et al. | 5,587,899 A | 12/1996 | Ho et al. |
| 5,452,201 A | 9/1995 | Pieronek et al. | 5,594,858 A | 1/1997 | Blevins |
| 5,457,797 A | 10/1995 | Butterworth et al. | 5,594,899 A | 1/1997 | Knudsen et al. |
| 5,459,825 A | 10/1995 | Anderson et al. | 5,596,331 A | 1/1997 | Bonaffini et al. |
| 5,459,839 A | 10/1995 | Swarts et al. | 5,596,752 A | 1/1997 | Knudsen et al. |
| 5,461,710 A | 10/1995 | Bloomfield et al. | 5,598,536 A | 1/1997 | Slaughter, III et al. |
| 5,463,735 A | 10/1995 | Pascucci et al. | 5,598,566 A | 1/1997 | Pascucci et al. |
| 5,467,264 A | 11/1995 | Rauch et al. | 5,600,845 A | 2/1997 | Gilson |
| 5,469,150 A | 11/1995 | Sitte | 5,604,737 A | 2/1997 | Iwami et al. |
| 5,469,570 A | 11/1995 | Shibata et al. | 5,604,871 A | 2/1997 | Pecone |
| 5,475,856 A | 12/1995 | Kogge | 5,608,607 A | 3/1997 | Dittmer |
| 5,481,715 A | 1/1996 | Hamilton et al. | 5,608,608 A | 3/1997 | Flint et al. |
| 5,481,741 A | 1/1996 | McKaskle et al. | 5,611,057 A | 3/1997 | Pecone et al. |
| 5,483,660 A | 1/1996 | Yishay et al. | 5,613,148 A | 3/1997 | Bezviner et al. |
| 5,485,617 A | 1/1996 | Stutz et al. | 5,613,164 A | 3/1997 | DiAngelo et al. |
| 5,485,620 A | 1/1996 | Sadre et al. | 5,613,190 A | 3/1997 | Hylton |
| 5,490,276 A | 2/1996 | Doli, Jr. et al. | 5,617,540 A | 4/1997 | Civanlar et al. |
| 5,491,625 A | 2/1996 | Pressnall et al. | 5,621,871 A | 4/1997 | Jaremko et al. |
| 5,491,791 A | 2/1996 | Glowny et al. | 5,621,890 A | 4/1997 | Notarianni et al. |
| 5,493,534 A | 2/1996 | Mok | 5,623,592 A | 4/1997 | Carlson et al. |
| 5,499,023 A | 3/1996 | Goldschmidt | 5,623,670 A | 4/1997 | Bohannon et al. |
| 5,499,365 A | 3/1996 | Anderson et al. | 5,627,979 A | 5/1997 | Chang et al. |
| 5,500,934 A | 3/1996 | Austin et al. | 5,629,872 A | 5/1997 | Gross et al. |
| 5,501,608 A | 3/1996 | Scheer et al. | 5,629,949 A | 5/1997 | Zook |
| 5,504,672 A | 4/1996 | Hardiman et al. | 5,630,056 A | 5/1997 | Horvath et al. |
| 5,504,895 A | 4/1996 | Kurosawa et al. | 5,630,152 A | 5/1997 | DeLuca et al. |
| 5,504,902 A | 4/1996 | McGrath et al. | 5,642,259 A | 6/1997 | Ma et al. |
| 5,509,811 A | 4/1996 | Homic | 5,642,511 A | 6/1997 | Chow et al. |
| 5,513,095 A | 4/1996 | Pajonk et al. | 5,648,768 A | 7/1997 | Bouve |
| 5,513,192 A | 4/1996 | Janku et al. | 5,649,121 A | 7/1997 | Budman et al. |
| 5,513,354 A | 4/1996 | Dwork et al. | 5,655,092 A | 8/1997 | Ojala |
| 5,517,655 A | 5/1996 | Collins et al. | 5,659,680 A | 8/1997 | Cunningham et al. |
| 5,519,605 A | 5/1996 | Cawlfield | 5,664,101 A | 9/1997 | Picache |
| 5,519,701 A | 5/1996 | Colmant et al. | 5,664,168 A | 9/1997 | Yishay et al. |
| 5,522,044 A | 5/1996 | Pascucci et al. | 5,671,374 A | 9/1997 | Postman et al. |
| 5,526,353 A | 6/1996 | Henley et al. | 5,676,141 A | 10/1997 | Hollub |
| 5,530,377 A | 6/1996 | Walls | 5,680,404 A | 10/1997 | Gray et al. |
| 5,530,643 A | 6/1996 | Hodorowski | 5,680,409 A | 10/1997 | Qin et al. |
| 5,530,868 A | 6/1996 | Record et al. | 5,682,317 A | 10/1997 | Keeler et al. |
| 5,531,328 A | 7/1996 | Rochelo et al. | 5,682,476 A | 10/1997 | Tapperson et al. |
| 5,534,912 A | 7/1996 | Kostreski | 5,687,316 A | 11/1997 | Graziano et al. |
| 5,537,548 A | 7/1996 | Fin et al. | 5,700,090 A | 12/1997 | Eryurek |
| 5,539,638 A | 7/1996 | Keeler et al. | 5,701,414 A | 12/1997 | Cheng et al. |
| 5,539,909 A | 7/1996 | Tanaka et al. | 5,701,484 A | 12/1997 | Artsy |
| 5,541,810 A | 7/1996 | Donhauser et al. | 5,704,011 A | 12/1997 | Hansen et al. |

| | | | | | |
|---|---|---|---|---|---|
| 5,706,502 A | 1/1998 | Foley et al. | 5,854,944 A | 12/1998 | Catherwood et al. |
| 5,708,709 A | 1/1998 | Rose | 5,859,966 A | 1/1999 | Hayman et al. |
| 5,708,779 A | 1/1998 | Graziano et al. | 5,862,052 A | 1/1999 | Nixon et al. |
| 5,713,045 A | 1/1998 | Berdahl | 5,864,773 A | 1/1999 | Barna et al. |
| 5,715,178 A | 2/1998 | Scarola et al. | 5,867,704 A | 2/1999 | Tanaka et al. |
| 5,716,221 A | 2/1998 | Kantner | 5,872,992 A | 2/1999 | Tietjen et al. |
| 5,717,880 A | 2/1998 | Imai et al. | 5,873,089 A | 2/1999 | Regache |
| 5,719,761 A | 2/1998 | Gatti et al. | 5,874,990 A | 2/1999 | Kato et al. |
| 5,726,912 A | 3/1998 | Krall, Jr. et al. | 5,875,430 A | 2/1999 | Koether |
| 5,727,128 A | 3/1998 | Morrison | 5,876,122 A | 3/1999 | Eryurek |
| 5,732,218 A | 3/1998 | Bland et al. | 5,878,415 A | 3/1999 | Olds |
| 5,734,902 A | 3/1998 | Atkins et al. | 5,880,775 A | 3/1999 | Ross |
| 5,737,529 A | 4/1998 | Dolin, Jr. et al. | 5,903,455 A | 5/1999 | Sharpe, Jr. et al. |
| 5,742,596 A | 4/1998 | Baratz et al. | 5,905,963 A | 5/1999 | Lysejko et al. |
| 5,742,762 A | 4/1998 | Scholl et al. | 5,909,368 A | 6/1999 | Nixon et al. |
| 5,746,511 A | 5/1998 | Eryurek et al. | 5,909,586 A | 6/1999 | Anderson |
| 5,748,467 A | 5/1998 | Qin et al. | 5,917,840 A | 6/1999 | Cheney et al. |
| 5,748,912 A | 5/1998 | Lee | 5,918,233 A | 6/1999 | La Chance et al. |
| 5,751,574 A | 5/1998 | Loebig et al. | 5,919,247 A | 7/1999 | Van Hoff et al. |
| 5,752,007 A | 5/1998 | Morrison | 5,920,479 A | 7/1999 | Sojoodi et al. |
| 5,752,008 A | 5/1998 | Bowling | 5,922,050 A | 7/1999 | Madany |
| 5,752,246 A | 5/1998 | Rogers et al. | 5,928,345 A | 7/1999 | Tetzlaff et al. |
| 5,754,772 A | 5/1998 | Leaf | 5,930,768 A | 7/1999 | Hooban |
| 5,758,073 A | 5/1998 | Liang et al. | 5,940,294 A | 8/1999 | Dove |
| 5,758,075 A | 5/1998 | Graziano et al. | 5,940,839 A | 8/1999 | Chen et al. |
| 5,761,033 A | 6/1998 | Wilhelm | 5,946,487 A | 8/1999 | Dangelo |
| 5,761,090 A | 6/1998 | Gross et al. | 5,956,484 A | 9/1999 | Rosenberg et al. |
| 5,761,405 A | 6/1998 | Tadamura et al. | 5,956,487 A | 9/1999 | Venkatraman et al. |
| 5,761,421 A | 6/1998 | van Hoff et al. | 5,959,487 A | 9/1999 | Kawamura |
| 5,761,518 A | 6/1998 | Boehling et al. | 5,960,205 A | 9/1999 | Mao et al. |
| 5,764,906 A | 6/1998 | Edelstein et al. | 5,960,214 A | 9/1999 | Sharpe, Jr. et al. |
| 5,768,119 A | 6/1998 | Havekost et al. | 5,966,304 A | 10/1999 | Cook et al. |
| 5,768,510 A | 6/1998 | Gish | 5,969,967 A | 10/1999 | Aahlad et al. |
| 5,774,378 A | 6/1998 | Yang et al. | 5,974,497 A | 10/1999 | Teshome |
| 5,774,670 A | 6/1998 | Montulli | 5,975,737 A | 11/1999 | Crater et al. |
| 5,777,874 A | 7/1998 | Flood et al. | 5,978,578 A | 11/1999 | Azarya et al. |
| 5,787,247 A | 7/1998 | Norin et al. | 5,978,933 A | 11/1999 | Wyld et al. |
| 5,787,272 A | 7/1998 | Gupta et al. | 5,980,078 A | 11/1999 | Krivoshein et al. |
| 5,790,791 A | 8/1998 | Chong et al. | 5,980,090 A | 11/1999 | Royal, Jr. et al. |
| 5,793,963 A | 8/1998 | Tapperson et al. | 5,982,362 A | 11/1999 | Crater et al. |
| 5,794,071 A | 8/1998 | Watanabe et al. | 5,982,762 A | 11/1999 | Anzai et al. |
| 5,796,602 A | 8/1998 | Wellan et al. | 5,988,852 A | 11/1999 | Nakanishi et al. |
| 5,797,038 A | 8/1998 | Crawford et al. | 5,991,795 A | 11/1999 | Howard et al. |
| 5,801,770 A | 9/1998 | Paff et al. | 5,994,998 A | 11/1999 | Fisher et al. |
| 5,801,942 A | 9/1998 | Nixon et al. | 5,995,916 A | 11/1999 | Nixon et al. |
| 5,802,389 A | 9/1998 | McNutt | 6,002,104 A | 12/1999 | Hsu |
| 5,805,442 A | 9/1998 | Crater et al. | 6,006,171 A | 12/1999 | Vines et al. |
| 5,805,922 A | 9/1998 | Sim et al. | 6,008,985 A | 12/1999 | Lake et al. |
| 5,812,394 A | 9/1998 | Lewis et al. | 6,014,591 A | 1/2000 | Ikeda et al. |
| 5,815,152 A | 9/1998 | Collier et al. | 6,014,612 A | 1/2000 | Larson et al. |
| 5,815,659 A | 9/1998 | Umetsu et al. | 6,018,627 A | 1/2000 | Iyengar et al. |
| 5,822,220 A | 10/1998 | Baines | 6,026,336 A | 2/2000 | Sakurai et al. |
| 5,828,567 A | 10/1998 | Eryurek et al. | 6,026,352 A | 2/2000 | Burns et al. |
| 5,828,851 A | 10/1998 | Nixon et al. | 6,032,208 A | 2/2000 | Nixon et al. |
| 5,828,882 A | 10/1998 | Hinckley | 6,033,257 A | 3/2000 | Lake et al. |
| 5,831,669 A | 11/1998 | Adrain | 6,035,264 A | 3/2000 | Donaldson et al. |
| 5,832,268 A | 11/1998 | Anderson et al. | 6,038,486 A | 3/2000 | Saitoh et al. |
| 5,832,418 A | 11/1998 | Meyer | 6,049,578 A | 4/2000 | Senechal et al. |
| 5,835,704 A | 11/1998 | Li et al. | 6,049,775 A | 4/2000 | Gertner et al. |
| 5,835,724 A | 11/1998 | Smith | 6,052,629 A | 4/2000 | Leatherman et al. |
| 5,838,563 A | 11/1998 | Dove et al. | 6,055,633 A | 4/2000 | Schrier et al. |
| 5,838,910 A | 11/1998 | Domenikos et al. | 6,061,603 A | 5/2000 | Papadopoulos et al. |
| 5,838,920 A | 11/1998 | Rosborough | 6,070,186 A | 5/2000 | Nishio et al. |
| 5,838,969 A | 11/1998 | Jacklin et al. | 6,070,250 A | 5/2000 | Yeager et al. |
| 5,841,360 A | 11/1998 | Binder et al. | 6,076,124 A | 6/2000 | Korowitz et al. |
| 5,841,654 A | 11/1998 | Verissimo et al. | 6,078,320 A | 6/2000 | Dove et al. |
| 5,841,963 A | 11/1998 | Nakamikawa et al. | 6,078,848 A | 6/2000 | Bernstein et al. |
| 5,841,991 A | 11/1998 | Russell | 6,085,120 A | 7/2000 | Schwerdtfeger et al. |
| 5,844,601 A | 12/1998 | McPheely et al. | 6,094,600 A | 7/2000 | Sharpe, Jr. et al. |
| 5,844,796 A | 12/1998 | Araki et al. | 6,095,674 A | 8/2000 | Verissimo et al. |
| 5,844,804 A | 12/1998 | Schussler et al. | 6,097,761 A | 8/2000 | Buhring et al. |
| 5,847,957 A | 12/1998 | Cohen et al. | 6,098,116 A | 8/2000 | Nixon et al. |
| 5,854,750 A | 12/1998 | Phillips et al. | 6,104,875 A | 8/2000 | Gallagher et al. |

| | | | | | | |
|---|---|---|---|---|---|---|
| 6,105,132 | A | 8/2000 | Fritch et al. | 6,788,980 B1 | 9/2004 | Johnson |
| 6,108,662 | A | 8/2000 | Hoskins et al. | 6,792,321 B2 | 9/2004 | Sepe, Jr. |
| 6,115,468 | A | 9/2000 | De Nicolo | 6,799,148 B2 | 9/2004 | Ling et al. |
| 6,129,449 | A | 10/2000 | McCain et al. | 6,799,195 B1 | 9/2004 | Thibault et al. |
| 6,131,067 | A | 10/2000 | Girerd et al. | 6,806,847 B2 | 10/2004 | Nixon et al. |
| 6,138,174 | A | 10/2000 | Keeley | 6,850,973 B1 | 2/2005 | Larson et al. |
| 6,139,177 | A | 10/2000 | Venkatraman et al. | 6,853,867 B1 | 2/2005 | Klindt et al. |
| 6,140,911 | A | 10/2000 | Fisher et al. | 7,020,532 B2 | 3/2006 | Johnson et al. |
| 6,151,625 | A | 11/2000 | Swales et al. | 7,032,045 B2 | 4/2006 | Kostadinov |
| 6,157,864 | A | 12/2000 | Schwenke et al. | 7,089,530 B1 | 8/2006 | Dardinski et al. |
| 6,167,253 | A | 12/2000 | Farris et al. | 7,096,465 B1 | 8/2006 | Dardinski et al. |
| 6,170,007 | B1 | 1/2001 | Venkatraman et al. | 7,100,165 B2 | 8/2006 | Eldridge et al. |
| 6,173,411 | B1 | 1/2001 | Hirst et al. | 7,146,231 B2 | 12/2006 | Schleiss et al. |
| 6,173,414 | B1 | 1/2001 | Zumkehr et al. | 7,151,966 B1 | 12/2006 | Baier et al. |
| 6,175,556 | B1 | 1/2001 | Allen, Jr. et al. | 7,156,513 B2 | 1/2007 | Ang et al. |
| 6,176,421 | B1 | 1/2001 | Royal, Jr. et al. | 7,158,513 B2 | 1/2007 | Wada et al. |
| 6,183,289 | B1 | 2/2001 | Lake et al. | 7,162,510 B2 | 1/2007 | Jammes et al. |
| 6,195,591 | B1 | 2/2001 | Nixon et al. | 7,177,052 B2 | 2/2007 | Lapstun et al. |
| 6,195,694 | B1 | 2/2001 | Chen et al. | 7,199,784 B2 | 4/2007 | Mathiowetz et al. |
| 6,195,774 | B1 | 2/2001 | Jacobson | 7,245,271 B2 | 7/2007 | Nixon et al. |
| 6,201,996 | B1 | 3/2001 | Crater et al. | 7,272,815 B1 | 9/2007 | Eldridge et al. |
| 6,212,440 | B1 | 4/2001 | Suzuki et al. | 7,275,062 B2 | 9/2007 | Deitz et al. |
| 6,212,608 | B1 | 4/2001 | Bak | 7,337,256 B2 | 2/2008 | Korowitz et al. |
| 6,216,158 | B1 | 4/2001 | Luo et al. | 7,356,588 B2 | 4/2008 | Stineman, Jr. et al. |
| 6,218,930 | B1 | 4/2001 | Katzenberg et al. | 7,372,914 B2 | 5/2008 | Calvin |
| 6,219,708 | B1 | 4/2001 | Martenson | 2001/0007133 A1 | 7/2001 | Moriconi et al. |
| 6,246,748 | B1 | 6/2001 | Yano et al. | 2001/0025307 A1 | 9/2001 | Venkatraman et al. |
| 6,260,187 | B1 | 7/2001 | Cirne | 2001/0034777 A1 | 10/2001 | Venkatraman et al. |
| 6,266,724 | B1 | 7/2001 | Harari et al. | 2001/0034778 A1 | 10/2001 | Venkatraman et al. |
| 6,268,789 | B1 | 7/2001 | Diamant et al. | 2001/0034779 A1 | 10/2001 | Venkatraman et al. |
| 6,269,473 | B1 | 7/2001 | Freed et al. | 2001/0034780 A1 | 10/2001 | Venkatraman et al. |
| 6,272,529 | B1 | 8/2001 | Lum | 2001/0034781 A1 | 10/2001 | Venkatraman et al. |
| 6,272,556 | B1 | 8/2001 | Gish | 2001/0037489 A1 | 11/2001 | Stripf et al. |
| 6,282,454 | B1 | 8/2001 | Papadopoulos et al. | 2001/0044836 A1 | 11/2001 | Venkatraman et al. |
| 6,295,356 | B1 | 9/2001 | De Nicolo | 2002/0046254 A1 * | 4/2002 | Khan et al. ................. 709/217 |
| 6,311,101 | B1 | 10/2001 | Kastner | 2002/0052928 A1 * | 5/2002 | Stern et al. ................. 709/218 |
| 6,314,464 | B1 | 11/2001 | Murata et al. | 2002/0067370 A1 | 6/2002 | Forney et al. |
| 6,324,607 | B1 | 11/2001 | Korowitz et al. | 2002/0133636 A1 | 9/2002 | Venkatraman et al. |
| 6,327,511 | B1 | 12/2001 | Naismith et al. | 2002/0150156 A1 | 10/2002 | Calvin |
| 6,345,382 | B1 | 2/2002 | Hughes | 2002/0188841 A1 | 12/2002 | Jones et al. |
| 6,348,874 | B1 | 2/2002 | Cole et al. | 2003/0051068 A1 | 3/2003 | Eldridge et al. |
| 6,353,860 | B1 | 3/2002 | Hare et al. | 2003/0167269 A1 | 9/2003 | Gupta |
| 6,370,448 | B1 | 4/2002 | Eryurek | 2003/0208558 A1 | 11/2003 | Venkatraman et al. |
| 6,393,050 | B1 | 5/2002 | Liu | 2004/0103165 A1 | 5/2004 | Nixon et al. |
| 6,405,099 | B1 | 6/2002 | Nagai et al. | 2004/0230643 A1 | 11/2004 | Thibault et al. |
| 6,405,210 | B1 | 6/2002 | Doyle et al. | 2006/0053491 A1 | 3/2006 | Khuti et al. |
| 6,412,070 | B1 | 6/2002 | Van Dyke et al. | 2006/0129724 A1 | 6/2006 | Kostadinov |
| 6,418,499 | B1 | 7/2002 | Korowitz et al. | 2006/0206860 A1 | 9/2006 | Dardinski et al. |
| 6,424,883 | B1 | 7/2002 | Hosokawa et al. | 2006/0212146 A1 | 9/2006 | Johnson et al. |
| 6,430,564 | B1 | 8/2002 | Judge et al. | 2006/0294579 A1 | 12/2006 | Khuti et al. |
| 6,442,442 | B1 | 8/2002 | Weinhofer | 2007/0019560 A1 | 1/2007 | Brewer et al. |
| 6,445,962 | B1 | 9/2002 | Blevins et al. | 2007/0055689 A1 * | 3/2007 | Rhoads et al. ............... 707/102 |
| 6,449,715 | B1 | 9/2002 | Krivoshein | 2007/0146231 A1 | 6/2007 | Hamahashi et al. |
| 6,473,660 | B1 | 10/2002 | Thibault | 2007/0233664 A1 | 10/2007 | Hardin et al. |
| 6,480,903 | B1 | 11/2002 | Voutaz et al. | 2008/0040477 A1 | 2/2008 | Johnson et al. |
| 6,487,214 | B1 | 11/2002 | Bachar | 2008/0046598 A1 | 2/2008 | Johnson et al. |
| 6,496,892 | B1 | 12/2002 | Lake et al. | 2008/0052386 A1 | 2/2008 | Johnson et al. |
| 6,499,048 | B1 | 12/2002 | Williams | 2008/0052632 A1 | 2/2008 | Thibault et al. |
| 6,501,995 | B1 | 12/2002 | Kinney et al. | 2008/0119951 A1 | 5/2008 | Thibault et al. |
| 6,510,352 | B1 | 1/2003 | Badavas et al. | 2008/0120367 A1 | 5/2008 | Thibault et al. |
| 6,571,140 | B1 * | 5/2003 | Wewalaarachchi et al. .... 700/83 | 2008/0126500 A1 | 5/2008 | Thibault et al. |
| 6,574,515 | B1 | 6/2003 | Kirkpatrick et al. | 2008/0133700 A1 | 6/2008 | Thibault et al. |
| 6,594,692 | B1 | 7/2003 | Reisman | 2008/0134215 A1 | 6/2008 | Thibault et al. |
| 6,612,022 | B1 | 9/2003 | Gale et al. | 2008/0148170 A1 | 6/2008 | Thibault et al. |
| 6,640,308 | B1 | 10/2003 | Keyghobad et al. | 2008/0151973 A1 | 6/2008 | Calvin |
| 6,671,763 | B1 | 12/2003 | Korowitz et al. | 2008/0222276 A1 | 9/2008 | Thibault et al. |
| 6,675,193 | B1 | 1/2004 | Slavin et al. | | | |
| 6,687,761 | B1 | 2/2004 | Collins et al. | | | |
| 6,691,183 | B1 | 2/2004 | Ryan, Jr. | | FOREIGN PATENT DOCUMENTS | |
| 6,718,533 | B1 | 4/2004 | Schneider et al. | EP | 0592921 | 4/1994 |
| 6,754,885 | B1 | 6/2004 | Dardinski et al. | EP | 0640905 | 3/1995 |
| 6,760,687 | B2 | 7/2004 | Apel et al. | EP | 0660231 | 6/1995 |
| 6,779,128 | B1 | 8/2004 | Gale et al. | JP | 11143511 | 5/1999 |

| WO | WO-9114324 | 9/1991 |
| WO | WO-9623377 | 8/1996 |
| WO | WO-9631047 | 10/1996 |
| WO | WO-9707486 | 2/1997 |
| WO | WO-9726587 | 7/1997 |
| WO | WO-9820649 | 5/1998 |
| WO | WO-9829804 | 7/1998 |
| WO | WO-9836518 | 8/1998 |
| WO | WO-9854843 | 12/1998 |
| WO | WO-9921322 | 4/1999 |
| WO | WO-0004805 | 2/2000 |
| WO | WO-0077592 | 12/2000 |
| WO | WO-0161706 | 8/2001 |
| WO | WO-03039098 | 5/2003 |

OTHER PUBLICATIONS

Wang et al., "Data extraction and label assignment for web databases", 12th international conference on World Wide Web, May 2003, p. 187-196 [online]. Retrieved from the Internet :< http://portal.acm.org/ft_gateway.cfm?id=775179&type=pdf&coll=ACM&dl=ACM&CFID=93294188&CFTOKEN=17685386>.*
"A sensation in supervisory control," Manufacturing Systems (Windows NT in manufacturing Supplement), Oct. 1996, pp. 12A-24A.
"Agenda," ISA/SP50—1988-180, ISA Draft. (1 page).
"At Interop, Will ToasterNet Be on the Hot List?" Data Communications, vol. 19, No. 13, Oct. 1990, p. 214.
"Automatic Control Systems," George J. Thayer, et al., pp. 1-60, 1989.
"Automation System Monitors, Controls Fab HVAC, Other Systems," *Microcontamination* (Aug. 1994) (1 page).
"Bsy's List of Internet Accessible Coke Machines," web page print-out (Feb. 12, 1999) from http://www-cse.ucsd.edu/users/bsy/coke.html (1 page).
"CMU SCS Coke Machine: Current Status," web page print-out (Feb. 12, 1999) from http://www.cs.cmu.edu/~coke/ (1 page).
"Control System Features Plug-and-Play Technology, Scalability," Chemical Processing (May 1996), p. 33.
"Disk Drive with Embedded Hyper-Text Markup Language Server," IBM TDB, vol. 38, n. 12, Dec. 1995, pp. 479-480.
"Elsag Bailey Automation," (in Italian, no date) (35 pages).
"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995. (2 pages).
"ErgoTech upgrades ErgoCim; First 'plug and play' component software for manufacturing," Business Wire, Feb. 15, 1996. (2 pages).
"Fisher-Rosemount Is: Managing the Process Better," Fisher Controls International, Inc. and Rosemount Inc. 1993. (19 pages).
"I/A Series Model 51 FoxRemote II Installation and Configuration Guide," Apr. 8, 1998 (Preliminary), pp. i-iv, 1-2.
"Industry's top embedded operating software supports Java; pSOSystem enables Embedded Internet applications and Low-cost Internet appliances," Business Wire, Feb. 1, 1996. (3 pages).
"Information technology in manufacturing," Manufacturing Systems, vol. 14, No. 12, Dec. 1996, pp. 54-78.
"Internet windows to the world," New Media Age, Oct. 26, 1995, p. 4.
"Introducing Bailey Evolution™. . . The sound investment strategy for process automation," Bailey infi 90 (brochure) (No Date) (30 Pages).
"Jim Henry's 1996 ASEE Paper," web page print-out from http://chem.engr.utc.edu/Documents/ASEE-96-full.html (5 pages).
"Make Your Automation Plan a Reality: MAX1000," Leeds & Northrup Technical Overview (no date) (38 Pages).
"NCR Fieldbus Slave Controller Advance Information," ISA-SP50-1988-161, ISA Draft. (4 pages).
"New Open Architecture Group Works on Control Standards," Control Engineering Online (Aug. 1997).
"New State-Logic Microcontroller," News Release, Control Technology Corp., Jun. 1, 1996, (DialogWeb search result) (1 page).
"On-Line Vending Machine and Catalog Product Icons," IBM TDB vol. 38 No. 4 (Apr. 1995), pp. 113-116.

"Peter Beebee's Home Page," web page print-out (Feb. 12, 1999) from http://www-swiss.ai.mit.edu/htbin/ptbbgate/jwz/?fetch+personal%2Fmain.text.html (2 pages).
"Process Manager Specification and Technical Data," UC03-300 Sep. 1991 Honeywell © 1990 (43 pages).
"Radio Field Bus," ISA/SP50—1988-184, ISA Draft, pp. 1-18.
"Signal Conditioners Designed for Fisher-Rosemount Systems Delta V," issued by M-System Co., Ltd. (Dec. 1997), (8 pages).
"Suggested Outline for Application Sub-committee Document: Fieldbus Architecture Subcommittee Document," ISA/SP50—1988-175, ISA Draft, pp. 1-7.
"TDC 3000 Overview,"Honeywell (no date) (23 pages).
"TDC 3000 Process Manager™: Process Connected Solutions for the Advanced Controls Requirements of the 1990s," Honeywell (no date) (10 pages).
"The 'Only' Coke Machine on the Internet," web page print-out (Feb. 12, 1999) from http://www.cs.cmu.edu/~coke/history_long.txt (3 pages).
"The Object Primer", Scott Ambler, pp. 1-248. Jan. 4, 1996.
"The Switzerland Coke Machine Credits," web page print-out (Feb. 12, 1999) from http://www-swiss.ai.mit.edu/htbin/coke/ (1 page).
"Tribe Announces Revolutionary Use of the Internet; Launches Innovative Remote Management Solution; New WebManage Technology Provides Network Management via World Wide Web," Business Wire, May 22, 1995. (2 pages).
"Tribe Computer Works' Net Products Can be Managed via World Wide Web," IAC (SM) Newsletter Database™, DataTrends Publications, Inc., No. 11, vol. 7, May 30, 1995. (2 pages).
"Tribe Launches First Networking Device Capable of Being Managed via Internet Web Browser; TribeLink2 Enables Remote Computing and Internet Access," Business Wire, May 22, 1995, (2 pages).
"Tribe Launches Innovative Remote Management Solution; New WebManage Technology Provides Network Management Via the World Wide Web," web page print-out (Jul. 12, 1999) from http://www.tribe.com/products/webmanage/wm_pr. (1 page).
"TribeRoute," web page print-out (Jul. 12, 1999) from http://www.tribe.com/products/tr/index. (3 pages).
"TribeStar," web page print-out from http://www.tribe.com/products/tribestar/index.htm (3 pages).
"UDC 6000 Process Controller: From Stand-alone Control to Full System Integration Honeywell Has a Solution for You," Honeywell (no date).
"Unbundling the DCS" (no publication information) (7 Pages).
"User Layer Structure," SP-50 Technical Report (Jul. 25, 1990). (522 pages).
"User Layer Technical Report," ISA/SP50—1990-389C, ISA Draft. (24 pages).
"Wide-range, Fully Compatible Family of Process Automation & Management Systems," Copyright © 1993 by Elsag Bailey Group as an Unpublished Work. (24 pages).
"WWWF'94: Papers Received," web page print-out (Apr. 7, 2000) from http://www.ncsa.uiuc.edu/SDG/IT94/Agenda/Papers-received.html (8 pages).
Andrews, "15 MB in a Matchbook" (Jan. 1995)http://www.byte.com/art/9501/sec4/art5.htm.
ANSI/ASME PTC 19.1-1985, "Part 1—Measurement Uncertainty", Apr. 30, 1986, entire document.
Application of PRIAM Model to Safety Systems on Offshore Oil/Gas Platforms. Silvertech Ltd., Jan. 9, 1995.
Batch Control. Part I: Models and Terminology. (Approved Feb. 28, 1995) ISA-S88.01-1995.
Baxter, Richard V., Jr. "Implementing Open Networking in a Motor Drive," The Imbedded Internet Workshop Real World Applications Session (Oct. 1, 1999) San Jose, CA.
Beestermoller, H.J., et al. "An Online and offline programmable Multi-Loop Controller for Distributed Systems," IEEE (1994), pp. 15-20.
Benkhallat, Yazid, et al. "Interoperability of sensors and distributed systems," Sensors and Actuators A vol. 37-38 (1993), 247-254.
Blevins, Terry. "Characteristics of Function Block Requirements for the Process Industry and Manufacturing Automation," Fisher-Rosemount, Oct. 31, 1995. (pp. 2-4).

Browne, Malcolme W. "South Pole Ready for Internet Revolution," The New York Times, Section C, col. 1, p. 1, Jan. 10, 1995.

Brunn, P. "Collision Avoidance for Two Robots Sharing a Common Workspace," (1995) The Institution of Electrical Engineers. (36 pages).

Burton, P. I. "A personal history of batch control," *Measurement + Control* vol. 27 (Apr. 1994), pp. 69-73.

Burton, P. I., et al. "Field Bus Based on MIL-STD-1553B: Proposal to ISA-SP-50" ERA Technology Ltd. (Apr. 6, 1988) ISA/SP50-1988-148. (pp. 1-125).

Capetta, L., et al. "From Current Actuators and Transmitters Towards Intelligent Actuation and Measurement: PRIAM Approach," BIAS 93. (pp. 1-15).

Caro, Richard H. "The Fifth Generation Process Control Architecture," ISA (1988) Paper #88-1487, pp. 659-667.

Caro, Richard H. "Field Bus Applications," ISA (1989) Paper #89-0569, pp. 989-994.

Chettle, Tim. "Multiplexing techniques optimise data collection," *Electrotechnology*(Oct./Nov. 1995). (2 pages).

Coleman, Vernon. "National Electrical Manufacturers Association Field Bus Report to ISA SP50," (Oct. 1988) ISA/SP50-1988-234 (14 pages).

Conference Record of the 1993 IEEE Industry Applications Conference, Part III (excerpt). (pp. 24-31).

Contents, Proceedings of the Second International Workshop on Configurable Distributed Systems, Mar. 21-23, 1994, Pittsburgh, PA. (pp. 5-7).

Control Shell Version 6.0 User's Manual, 426 pgs., Jan. 1999.

ControlShell version 5.1, User's Manual, Real-Time Innovations, Jun. 1996, Whole manual.

Craig, Lynn W. "SP-88 Defines Batch Control," *INTECH* Mar. 1994, pp. 34-37.

Crowder, R. S. "Generic Data Link Transactions for Simple Devices," Proposal to ISA SP 50 & IEC/SC65C/WG6 (Oct. 15, 1988) ISA Document. (15 pages).

Demetratekes, Pam. "Go with the info flow; state-of-the-art automation in the food industry; includes related article on computer software for food processors," Food Processing, vol. 57, No. 7, Jul. 1996, p. 47.

Dryden, Patrick, "Tribes WebManage Enables Remote Fixes," ComputerWorld, May 22, 1995, p. 14.

Duffey, C.K., et al. "High-Level Control Language Customizes Application Programs," IEEE Computer Applications in Power (1991), pp. 15-18.

Editing Committee Draft Application Layer, Version 12, Oct. 1991. (282 pages).

Editing Committee Draft Application Layer, Version 6, Dec. 1990, (260 pages).

Editing Committee Draft Application Layer, Version 8, May 1991. (344 pages).

Elmer-Dewitt, Philip, "Snowballs in Cyberspace; With a modem and a soldering iron, you too can build an Internet site that is really cool and totally useless," Time, Jan. 16, 1995, p. 57.

Esprit Project 6188, "PRIAM Dictionary: Major Terms and Definitions Used in the PRIAM Project," Prenormative Requirements for Intelligent Actuation and Measurement, May 1995, 14 pages.

Esprit Project 8244, "User Requirements for Intelligent Transmitters and Actuators," European Intelligent Actuation and Measurement User Group, Nov. 24, 1995, (4 pages).

Fieldbus Standard for Use in Industrial Control Systems. Part 2: Physical Layer Specification and Service Definition. (1992) ANSI/ISA-S50.02., pp. 1-103.

Foster, Kirsten. "surf's up; lights, camera, but no action; Steve is a Tech-Nomad. He wanders the streets with a camera on his head. And he wants you to join him," The Independent (London), Aug. 13, 1995, p. 10.

Foxboro Fieldbus Proposal (Presented to ISA/SP-50 Committee Feb. 24, 1988) ISA/SP50-1988-123B, ISA Draft, pp. i-xxii, 1-200.

Foxboro, "I/A Series Software FoxDraw", 8 pgs., 1996.

Foxboro, "Intelligent Automation Series Human Interface Software", 20 pgs., 1997.

Fulcher, Jim and Dilger, Karen Abramic, "Soft control, Internet spark ISA/96," Manufacturing Systems, vol. 14, No. 12, Dec. 1996, pp. 40-46.

Furness, Harry. "Fieldbus: The Differences Start From the Bottom Up," Control Engineering (Mar. 1994), pp. 75-77.

Gertz, Matthew, et al. "A Human-Machine Interface for Distributed Virtual Laboratories," IEEE Robotics & Automation Magazine 1 Dec. 1994, No. 4 (New York) pp. 5-13.

Gleick, James. "Fast Forward; Really Remote Control," The New York Times, Section 6, col. 3, p. 42, Dec. 3, 1995.

Goldberg, Ken, et al. "Beyond the Web: Excavating the Real World Via Mosaic," (Conference Paper) The Mercury Project (Oct. 17-21, 1994).

Goldberg, Ken, et al. "Desktop Teleoperation via the World Wide Web," IEEE International Conference on Robotics and Automation, pp. 654-659, (1995).

Goldstein, Ira and Hardin, Joseph, "Guest editorial," Computer Networks and ISDN Systems 28 (1995) p. 1.

Gyorki, John R. "PLCs drive standard buses," Machine Design (May 11, 1995), pp. 83-90.

H.J. Beestermoller et al., "An Online and offline programmable Multiple-Loop Controller for Distributed Systems", *IEEE* (1994), pp. 15-20.

Hashemian, et al., "In-Situ Response Time Testing of Thermocouples", ISA 1989, Paper #89-0056, pp. 587-593.

Henry, "A Fault-Tolerant Interface for Self-Validating Sensors", Oxford University, Digest No. 1990/145 (Nov. 1990).

Henry, "A New Approach to Sensor Validation", IMC, Mar. 17, 1992.

Henry, et al., "The Implication of Digital Communications on Sensor Validation," University of Oxford, Report No. OUEL 1912/92.

Henry, Jim, Ph.D., P.E. "LabVIEW Applications in Engineering Labs: Controls, Chemical, Environmental," ASEE Conference, Anaheim, CA, Jun. 25-28, 1995, web page print-out from http://chem. engr.utc.edu/Documents/ASEE-95-full.html (22 pages), Apr. 10, 2001.

Holding, David and Wood, Graham. "Communications in microprocessor industrial implementation," Microprocessors and Microsystems vol. 3 No. 10 (Dec. 1979), pp. 443-451.

*ICCard Design* Sep./Oct. 1995.

Invensys, "FoxDraw Display Builder and Configurator", 8 pgs., 2004.

Johnson, Dick. "Pressure Sensing Advances: Are They in Your Process' Future?" Control Engineering (Apr. 1995), pp. 67-72.

Johnsson, et al., "High-Level Grafcet and Batch Control", Nov. 1994, Symposium ADPM.

Kelly, D. Mark. "Digital fieldbus cluster cuts plant's wiring costs up to 20%," INTECH (Apr. 1995), pp. 62-64.

Kline, "The Purposes of Uncertainty Analysis", vol. 107, Journal of Fluids Engineering, pp. 153-160 (Jun. 1985).

Ko, Diffu, "Tribe defines net management role for Web browser software," Network World, May 22, 1995, p. 14.

Kostas, et al., "Real-Time Voice Over Packet-Switched Networks", pp. 18-27, IEEE Network (Jan./Feb. 1988).

Koth, H. and Oeder, K. "The Advantages of Intelligent Field Modules for Nuclear Power Plant Operation and Maintenance," Kerntechnik 60 (1996) 5-6, pp. 215-219.

Lenhart, Gerald W. "A Field Bus Approach to Local Control Networks," ISA, Paper #93-281, 1993. (4 pages).

Lenhart, Gerald W. "Fieldbus-Based Local Control Networks," INTECH (Aug. 1994), p. 31-34.

Leon, Mark, "Tektronix to add Web software on new printers," InfoWorld, Dec. 4, 1995, p. 6.

Loose, Graham. "Fieldbus—the user's perspective," Measurement + Control vol. 27 (Mar. 1994), pp. 47-51.

Martin, "Design and Strategy for Distributed Data Processing", Chptrs. 19 & 20, pp. 272-305 (1981).

Meeting Minutes, Ad Hoc Function Block Meeting, Jun. 14, 1990, Chapel Hill, NC, pp. 1-60.

Meeting Minutes, Process Control Working Group of SP50.4, Jan. 21-23, 1991, Atlanta, GA. (8 pages).

Meeting Minutes, SP50, International Electrotechnical Commission, Technical Committee No. 65: Industrial-Process Measurement and Control, Sub-Committee 65C: Digital Data Communications for Measurement and Control and Working Group 6: Field Bus Standard f, Feb. 29-Mar. 4, 1988, Arizona, (143 pages).

Meeting Minutes, SP50, Signal Compatibility of Electrical Instruments, Dec. 5-7, 1990, Orlando, FL. (64 pages).

Meeting Minutes, SP50.4 Application Layer, Oct. 19-21, 1988, Houston, TX. (96 pages).

Meeting Minutes, Windows Working Group of Application Subcommittee, Mar. 1-3, 1989, New Orleans, LA, pp. 1-8.

Meeting Notes, International Electrotechnical Commission Sub Committee No. 65C: Digital Communications Working Group 7, Process Control Function Blocks Report to AMT/7. Apr. 4, 1996. (42 pages).

Mirabella, Orazio. "A Short Presentation of IEC Fieldbus Application Layer," Informatics and Communication Institute, Engineering Faculty, University of Catania, Italy. (54 pages) (no date).

Momal, F. and Pinto-Pereira, C. "Using World-Wide-Web for Control Systems," from Proceedings 1995 International Conference on Accelerator and Large Experimental Physics Control Systems, Chicago, IL, Oct. 30-Nov. 3, 1995. (10 pages).

Morel, G., et al. "Discrete Event Automation Engineering: Outline of the PRIAM Project." (12 pages) (no date).

Mori, et al., "The PCMCIA Developer's Guide, Second Edition," Sycard Technology 1994.

NOAH: Network Oriented Application Harmonisation based on General Purpose Field Communication System. Project description rev. 1.0, Oct. 25, 1995. P-NET, PROFIBUS, WorldFIP, pp. 1-22.

Nobuhiko, Tsuji, et al. "An Advanced Optical Fieldbus Instrumentation System Using 16×16 Reflection Type Optical Star Coupler and Low Powered Transmitter," pp. 755-764. (no date).

Notte, Angelo J. "Multitasking Capability Simplifies Process Control Design" (no date).

Pace, Hugh W. "Valve Actuators Ready for Fieldbus," Control Engineer (Oct. 1995), pp. 65-73.

Pages from Aspentech.com website as of Apr. 1999, retrieved from Internet archive http://web.archive.org.

Pages from Aspentech.com website as of Dec. 1997, retrieved from Internet archive http://web.archive.org.

Pages from Aspentech.com website as of Dec. 1998, retrieved from Internet archive http://web.archive.org.

Pages from Aspentech.com website as of Jan. 1997, retrieved from Internet archive http://web.archive.org.

Pages from Aspentech.com website as of Oct. 1996, retrieved from Internet archive http://web.archive.org.

Pages from SL.com website as of 1999, retrieved from Internet archive http://web.archive.org.

Pages from SL.com website as of 2000, retrieved from Internet archive http://web.archive.org.

Pages from SL.com website as of Apr. 1999, retrieved from Internet archive http://web.archive.org.

Pages from SL.com website as of Dec. 1998, retrieved from Internet archive http://web.archive.org.

Pages from SL.com website as of Feb. 1997, retrieved from Internet archive http://web.archive.org.

Pappalardo, Denise, "Digi Introduces IP/IPX Router," InternetWeek, Apr. 24, 1995, p. 15.

Pappalardo, Denise, "Router Can Be Managed via Net," InternetWeek, May 22, 1995, p. 6.

Peshek, Clifford J., et al. "Recent Developments and Future Trends in PLC Programming Languages and Programming Tools for Real-Time Control," IEEE Cement Industry Technical Conference (May 1993) Toronto, Canada, pp. 219-230.

Petti, Thomas F. and Dhurjati, Prasad S. "A Coupled Knowledge Based System Using Fuzzy Optimization for Advisory Control," IChE Journal vol. 38 (Sep. 1992) No. 9, pp. 1369-1378.

Pfeifer T. and Fussel B. "Sensorbetriebssystem fur messtechnische Problemstellungen in der Produktionstechnik," Technisches Messen vol. 58 (1991) Nos. 7/8.

Phinney, Thomas L. "An Analysis of Contending Proposals in ISA SP-50 for an ISA/IEC Field Instrument Bus," ISA (1988) Paper #88-1489. (5 pages).

Pinto, Jim. "The Great Fieldbus Debate—is Over," Action Instruments (www.actionio.com) (originally published in Industrial Controls Intelligence, Nov. 1999).

Preface: Field Bus Process Control User Layer Technical Support, Feb. 10, 1993, pp. 1-8.

Product Specification, I/A Series® RBATCH II, Apr. 1995. (169 pages).

Proway-Lan Industrial Data Highway. (Approved Feb. 3, 1986) ISA—S72.01-1985, pp. 1-204.

Report from IEC TC65 Working Group 6 Function Blocks, May 1, 1995. (7 pages).

Rodriguez, Karen, "Tribe sets software," Interactive Age, vol. 2, No. 15, May 22, 1995, p. 25.

Silverman, Dwight. "'Attaboy' for the best software and hardware of 1994," The Houston Chronicle, Dec. 25, 1994, p. 2.

Skabowski, E. L. "Recommendations for Consideration at Oct. 1988 Application Layer Subcommittee Meeting," (Oct. 3, 1986). (17 pages).

Slater, A. F. "Controlled by the Web," Computer Networks and ISDN Systems 27 (1994) pp. 289-295.

SNAP Foundation Template "Using the SNAP Development Environment," Version 8.0, Chapters 1-4, 1997.

Solvie, Michael J. "Configuration of Distributed Time-Critical Fieldbus Systems," IEEE (1994), p. 211.

Soreide, N. N., et al. "Mosaic access to real-time data from the TOGA-TAO array of moored buoys," Computer Networks and ISDN Systems 28 (1995), pp. 189-197.

Stapleton, Nick. "802.3 Working Group DTE Power via MDI Call for interest," 3Com (Jul. 1999). (15 pages).

Stevens, et al. "TCP-IP Illustrated, vol. 1. The Protocols," TCP-IP Illustrated vol. 1, XP-002106390, 1993, pp. 85-96 (Chapter 7, "Ping Program").

Strack, Bob. "The HAWK is Soaring," Chemical Processing (May 1996) p. 11.

Strothman, Jim and Ham, John. "ISA/95 New Orleans: 'Open', NT winds (not Opal) blow strong," INTECH (Nov. 1995), pp. 45-48.

Strothman, Jim and Ham, John. "Alliances, Fieldbus, Windows Stir ISA/94 Anaheim Pot," INTECH (Dec. 1994), pp. 32-35.

Table of Contents, Automation & Technology Department, 1993. (11 pages).

Table of Contents, Automation & Technology Department, 1995. (20 pages).

Table of Contents, Industrial Computing Society (no date). (8 pages.).

Table of Contents, ISA/88, Houston, TX, (1988). (9 pages).

Table of Contents, ISA/89, (1989). (10 pages).

Table of Contents, Proceedings of the Industrial Computing Conference, vol. 3, Sep. 19-24, 1993, Chicago, IL. Industrial Computing Society. (9 pages).

Taylor, "Object Oriented Information Systems", 368 pgs., Apr. 10, 1992.

Taylor, Ken and Trevelyan, James, "A Telerobot on the World Wide Web," printed from http://telerobot.mech.uwa.edu.au/ROBOT/telerobo.htm (14 pages) (1995).

The Foxboro Company, "FoxCMS Change Management System Software," 48 pgs., Aug. 14, 1996.

Tinham, "Networks & surprises at C&I and ISA shows; Control and Instrumentation Exhibition and Conference; Instrument Society of America; includes related articles," vol. 26; No. 6, p. 43; ISSN: 0010-8022 (Jun. 1994).

Tinham, Brian, "Getting SCADA by web browsner? Supervisory Control and Data Acquisition," Control and Instrumentation, No. 12, vol. 28, Dec. 1996, p. 5.

Tobin, David. "Southeast Paper Installs Largest Foxboro Distributed Control System." (no date) (3 pages).

Toner, Mike. "Web's view of world far and wide," The Houston Chronicle, Nov. 5, 1995, p. 6.

Tweney, "Java on Your Mobile Phone?", http://www.business2.com (Mar. 14, 2002).

Weinert, A., et al. "RT/OS—realtime programming and application environment for the COSY control system," Nuclear Instruments and Methods in Physics Research A vol. 352 (1994), pp. 277-279.

Welch, Nathalie, "Tribe to manage via Web; Tribe Computer Works Inc.'s TribeLink2 Product Announcement," MacWEEK, vol. 9, No. 21, May 22, 1995, p. 18.

WG1 List of Criteria (Appendix 1), (Oct. 21, 1988) ISA/SP50-1988-242, ISA Draft. (10 pages).

Wolfe, Alexander, "Strong Brew," Electronic Engineering Times, Apr. 8, 1996, p. 73.

Wood, G. G. "Current Fieldbus activities," computer communications vol. 11 (Jun. 1988) No. 3, pp. 118-123.

Wood, G. G. "Evolution of communication standards for the process industry," Measurement + Control vol. 19 (Jul./Aug. 1986), pp. 183-188.

Wood, G. G. "Survey of LANs and Standards," Computer Standards & Interfaces vol. 6 (1987), pp. 27-36.

Wood, G. G. "The Argus CONSUL System for On-Line Computer Control," Electrical Engineering Transactions (Mar. 1969), pp. 114-118.

Wood, G. G. "The Challenge of Standards for Plant Communication," IFAC Distributed Computer Control Systems (1982), pp. 191-192.

Wood, G. G. "Towards digital information control," Measurement + Control vol. 21 (Jul./Aug. 1988), pp. 179-180.

Wood, Graeme G. "Data Transmission, Processing and Presentation," pp. 46-54. (no date).

Wood, Graeme, G. "Standardisation Work for Communication Among Distributed Industrial Computer Control Systems—A Status Report," INRIA (1984), pp. 67-69.

Wood, Graeme. "Fieldbus Status 1995," Computing & Control Engineering Journal (Dec. 1995), pp. 251-253.

Wood, Graeme. "Generic Link Transactions for Simple Devices in Fieldbus." ISA/SP50-1988-240 (Sep. 20, 1988). (6 pages).

Zeff, Joe. "Maui Sunset in Real Time (Modems not Optional)," The New York Times, Nov. 27, 1995, Section D, col. 2, p. 5.

International Search Report and Written Opinion, PCT/US07/08005, Mar. 30, 2007, 20 pgs.

Pages from http://msdn.microsoft.com/en-us/library/default.aspx, downloaded Jan. 27, 2009, 1pg.

Pages from http://msdn.microsoft.com/en-us/office/aa905504.aspx, downloaded Jan. 27, 2009, 2pgs.

Pages from http://msdn.microsoft.com/en-us/magazine/2007.01.sharepoint.aspx, downloaded Jan. 27, 2009, 5 pages.

Pages from http://msdn.microsoft.com/en-us/library/ms495418.aspx, downloaded Jan. 27, 2009, 3pgs.

Pages from http://msdn.microsoft.com/en-us/library/ms570748.aspx, downloaded Jan. 27, 2009, 5pgs.

\* cited by examiner

DIGITAL DATA PROCESSING APPARATUS AND METHODS FOR IMPROVING PLANT PERFORMANCE

REFERENCE TO RELATED APPLICATION

This application claims the benefit of priority of U.S. Provisional Patent Application Ser. Nos. 60/788,373, filed Mar. 30, 2006 (entitled "Improved Digital Data Processing Apparatus and Methods for Improving Plant Performance") and 60/856,572, filed Nov. 3, 2006 (entitled "Further Improved Digital Data Processing Apparatus and Methods for Improving Plant Performance"), the teachings of both of which are incorporated herein by reference.

BACKGROUND OF THE INVENTION

The invention pertains to digital data processing and, more particularly, to improved methods and apparatus for integration of internet search technologies. The invention has application, by way of non-limiting example, in improving the performance and management of manufacturing (and other) plants whose operations are reflected by real-time automation data.

Today's manufacturing plants and other automation facilities have a wealth of data represented as files, databases and real time automation data. Systems exist to manage this information, but it has traditionally been viewed in two highly separated worlds, the world of enterprise or business systems and the world of control or process automation systems. In fact there is another dichotomy of data—that which is real time (dynamic) and that which is recorded (static)—generally file-based or database structured.

The prior art includes U.S. Patent Application Publication US2002/0067370, entitled "Extensible Manufacturing/Process Control Information Portal Server," assigned to the assignee hereof, the teachings of which are incorporated herein by reference.

An object of this invention is to provide improved methods and apparatus for digital data processing.

A further object is to provide such methods and apparatus as are adapted for improving the performance of manufacturing (and other) plants with real-time automation data.

A still yet further object of the invention is to provide such methods and apparatus as can be adapted for use with existing and future automation and web technologies.

SUMMARY OF THE INVENTION

The foregoing objects are attained by the invention which provides, in one aspect, human machine interface (HMI) methods and apparatus that permit users to search and/or view plant and other real-time automation data in a manner similar to that with which they search and/or view pages on the Internet (web).

Related aspects of the invention provide such methods and apparatus as permit users to search and/or view such real-time automation data concurrently with such Internet web pages. Further related aspects of the invention provide such methods and apparatus as permit users to search and/or view such real-time automation data concurrently with business data maintained on an enterprise network (e.g., a LAN, WAN or otherwise).

The invention provides, in other aspects, such methods and apparatus which utilizes "web crawler" search engine technology to collect real-time automation data for such searching and/or viewing by users. Related aspects of the invention provide such methods and apparatus in which that web crawler search engine technology also searches and indexes pages on the Internet and/or enterprise network.

Still other aspects of the invention provide such methods and apparatus which utilize a web browser as an interface via which users search and/or view real-time process automation data, as well as web pages and/or business data on the enterprise network.

Yet still other aspects of the invention provide such methods and apparatus which transfer real-time process automation data from a repository of plant automation data to the web crawler for indexing and use in resolving user queries. Related aspects provide such methods and apparatus which transfer field device tool (FDT) data and object linking and embedding for process control (OPC) data to the web crawler for such indexing and use.

Further related aspects of the invention provide such methods and apparatus in which such transfers are effected by presenting the real-time process automation data, the FDT data and/or OPC data to the web crawler as if that data were web pages with related attributes. Related aspects of the invention provide such methods in which such data is presented to the web crawler with metadata of control point, state, alarm condition, description, status, and value in place of conventional web page file metadata (e.g., size, author, date created, key words).

Still further related aspects of the invention provide such methods and apparatus in which the foregoing transfers are effected by an interface that updates the real-time process automation data, the FDT data and/or OPC data indexed by the web crawler as change driven data. Related aspects of the invention provide such methods and apparatus in which the index is updated based either on scheduling or on demand by an application programming interface (API).

In other aspects, the invention provides methods and apparatus as described above in which policies that direct how the web crawler behaves are controlled such that it can be interrupted and redirected in a new direction based on a forcing policy associated with process state, alarm conditions or events.

These and other aspects of the invention are evident in the drawings and in the description that follows. Advantages of methods and apparatus according to the invention include, among others, that they provide a view of the entire enterprise in reality—real time and historical—allowing users to view any relationship in any context, thereby providing an new and valuable means of better understanding the business of the enterprise.

BRIEF DESCRIPTION OF THE DRAWINGS

A more complete understanding of the invention may be attained by reference to the drawings, in which.

Figure 1:
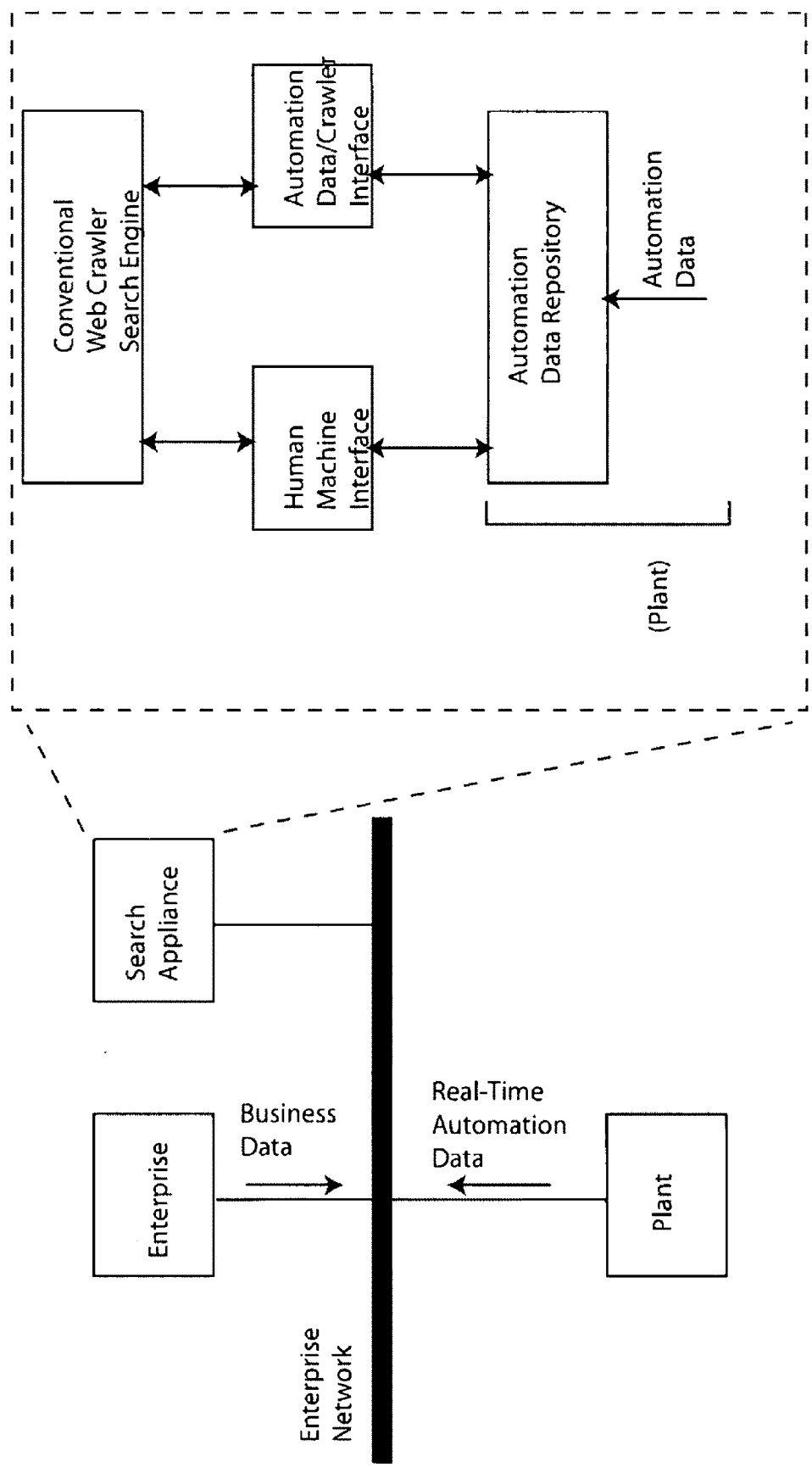
FIG. 1 depicts an architecture of a system according to the invention, along with an environment in which it operates.

DETAILED DESCRIPTION OF THE
ILLUSTRATED EMBODIMENT

Google has forever changed the expectations of people regarding the ease, speed and breadth of information access. By full-text indexing a substantial portion of the Internet's web site content, Google has indeed succeeded in bringing information to the people. A very important issue is that the information contained on Internet web sites is essentially unstructured text data with minimal encoded semantic information in the form of metadata (e.g. data about data). In response, Google created a mechanism for "weighting" information based on the number of links that reference a site's content. The more links, the more "important" the site content. This concept enables the ability to assign "relevance" to large quantities of essentially unrelated and unstructured information providing easy information mining using simple ad-hoc queries. This ease however comes at a price. Google is essentially a gigantic information cache which is updated infrequently at irregular intervals. For static information that doesn't change often, this isn't a big issue. Old data is usually better than no data. For dynamic information that does change, this highly non-deterministic behavior results in a lot of stale, invalid data.

Within a typical enterprise, information comes in all flavors. A lot of corporate business information is well structured and lives within highly-normalized relational databases attached to enterprise line-of-business (LOB) applications such as Enterprise Resource Planning (ERP). These applications provide user interface and reporting/querying facilities that broker information that is internally maintained. Other information lives on user desktops in the form of Microsoft Office files such as Excel spreadsheets and Word documents, all by way of non-limiting examples. In between the core enterprise systems and user desktops are files stored on network servers and intranet sites.

A manufacturing enterprise has additional information that resides within systems that are directly involved with process manufacturing execution, asset management and process automation. Some of these data are relatively static such as configuration information and some are highly dynamic such as information directly related to manufacturing processes. From a user perspective, there also appears to be an "inverse-square law" associated with manufacturing information. Simply stated, the further a user is away from an information source, the less that user understands the information source and its context. The casual user often does not have access to the fine-grained information that power users have because of high-cost license fees or special training requirements.

As an example, when plant mechanical engineering personnel are designing a piece of equipment, they often refer to outdated process specifications. It would be advantageous for them to access actual process data associated with the particular equipment involved. This could be accomplished using a simple equipment query to the portal which would return a list of relevant instrument tagnames. Upon selecting an instrument tagname, the user could navigate to an existing long-term trend report or view historical statistics. Note that information correlation of this type is often not straight-forward due to the fact that equipment databases are normally separate from process databases. An engineer located in a remote corporate engineering office would probably have less "local knowledge" and therefore could benefit even more from simplified search technology. It may not be long before "Googling" will be as important looking into an enterprise as it is today for looking out into the Internet.

Google® provides application program interfaces (APIs) that permit tailoring of responses to search engine requests and, specifically, that permit creation, editing, deletion, viewing and updating of stored data in the form of Google data API ("GData") feeds, as well as that permit control over how search results are requested and presented to end users. These and other APIs (including but not limited to the Google Data APIs, Google Base Data API, Google Search Appliance APIs) are described and publicly available at http://code.google.com/apis.html and are incorporated herein by reference, Microsoft® has developed products to provide easy and fast access to correlated information that resides in this distributed heterogeneous collection of repositories. These technologies are encapsulated within Microsoft Enterprise Search, the next generation platform of indexing and query technology. This technology is common across both server and desktop platforms including Vista and XP Desktop Search as well as the upcoming Microsoft Office Sharepoint Server 2007. Microsoft Enterprise Search is Microsoft's next generation platform of indexing and query technology. This technology is common across both server and desktop platforms including Vista and XP Desktop Search as well as the upcoming Microsoft Office Sharepoint Server 2007 (e.g. MOSS). A further understanding of this technology may be attained by reference to http://msdn.microsoft.com/library/ and http://msdn.microsoft.com/office/server/moss/, the teachings of which are incorporated by reference.

FIG. 1 depicts an architecture of a system according to the invention, along with an environment in which it operates. Together, these include a plant or other automation system (labeled "Plant," by way of non-limiting example) that generates real-time automation data, enterprise data system (labeled, "Enterprise," by way of non-limiting example) that generates/stores enterprise or other business data, and a search appliance. Both the automation system and enterprise data system may be of the type known in the art.

The search appliance (so labeled in the drawing) comprises any digital data processing apparatus suitable for operation in accord with the teachings hereof. This may be a dedicated digital data processing device (such as a workstation or minicomputer) or it may represent functionality executed, along with one or more other applications, on a workstation, minicomputer or other digital data processing apparatus. Though shown here directly coupled to the enterprise network—and, thereby, in communications coupling with the enterprise data system and the automation system—in other embodiments it may be so placed in communications coupling by way of one or more other networks, such as the Internet.

As further shown in the drawing the search appliance comprises a human machine interface (HMI) and an automation data/crawler interface, both of which are coupled to an data repository that forms part of the automation system and/or otherwise serves as a repository for data therefrom.

The human machine interface of the illustrated embodiment comprises a digital data processing apparatus (e.g., personal computer, workstation, personal digital assistant, or otherwise) that executes a conventional (or other) web "browser," the operation of which is adapted in accord with the teachings hereof, to permit users to search and/or view real-time automation data in a manner similar to that with which they search and/or view conventional web pages on the Internet and/or within the enterprise (e.g., on the enterprise network).

In the illustrated embodiment, the automation data repository forms part of the ArchestrA® manufacturing process control system commercially available from the assignee hereof, though in other embodiments it represents such repositories for storing data from other automation systems.

The search appliance further includes a conventional web crawler search engine, whose operation is utilized and/or adapted in accord with the teachings hereof. Generally speaking, search engines operate on the basic concept of scanning or "crawling" a directed graph of nodes. At each node encountered, the Search Engine retrieves and indexes the data content discovered at that node. Nodes are identified by URL such as http://MyDomain/MySite.coms. In the first illustrated embodiment, this is a crawler based on the Google® search engine, the application program interface (API) of which is publicly available from the company by that same name. Other embodiments may utilize other crawler and/or search engine technology known in the art—again, as adapted in accord with the teachings hereof.

That Google® API contemplates a large number of file types and database access routines. The illustrated embodiment utilizes an interface (see FIG. 2) to that API (and, therefore, to the web crawler) that provides dynamic automation data in a dynamically updating table. That interface additionally dynamically reconfigures the behavior of the search engine to re-index (re-search) the dynamic data based on a unique combination of prioritization, scheduling, on demand or by exception algorithms. As will be evident to those skilled in the art, unique aspects of this design include, among others:

aggregation of all (or selected portions of) real-time automation data
can be adapted to work with any existing automation or control system
can be adapted to work with any web-based human machine interface (HMI).

In the illustrated embodiment, a request by the user (via the HMI) for a process variable (or other process attribute) is met with a unified display showing results for the dynamically updating variable (or attribute), its historical values and it current configuration parameters. Likewise, a search on "brown sugar" would result in recipes, suppliers, markets, where and how brown sugar is being used in the process yesterday, today or tomorrow (as reflected in real-time automation data from the Plant). As with other search technology data, relevance is a function of the user and is managed by the actual user's behavior. This user interface provides prioritized data based on any number of configuration parameters, e.g., Alarm, value, cost, critically, etc.

Other applications of the illustrated embodiment include, by way of non-limiting example:

Prioritized search engines that can communicate with each other and supervisory applications providing a unique mix of real time and historical date allowing new degrees of placing information within context. This allows multiple data feeds to be integrated and examined by other data modeling packages (e.g., such as those commercially available from the SimSci-Esscor of the assignee hereof) to determine trends and make prognostic decisions, useful for process optimization, asset management, maintenance, safety, supply chain, and plant security.

Figure 2:
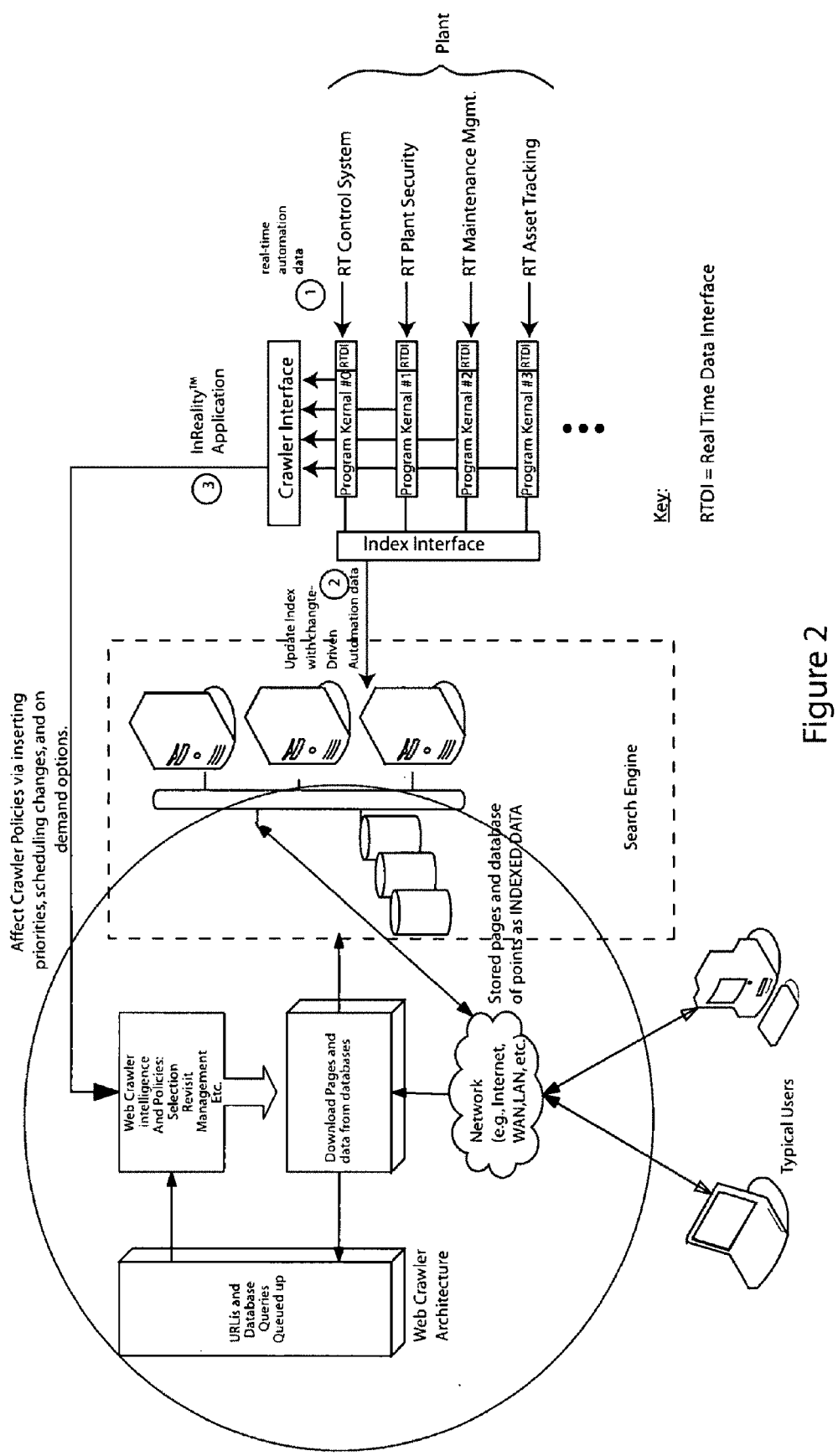
FIG. 2 is a more detailed view of the system of FIG. 1.

FIG. 2 is a more detailed view of the system of FIG. 1, showing inter alia automation data/web crawler interface as including three interfaces (labeled, (1), (2) and (3)) and managed by functionality referred to herein, for sake of convenience and without limitation, as "InReality."

The normal output of a crawler is to download web pages, extract links, make determinations as to where to go next and pass the pages off to a search engine that will index them for retrieval. The index contains meta-data on the page as well as pages themselves, in a cache. The crawler is constantly updating the index while users are requesting searches from the search engine that first relies on the index for the requested data.

The first interface, labeled (1), is between the InReality application and the Plant's real time data. Four "sub-" interfaces are shown, though, other embodiments may have greater or fewer. The first such sub-interface is between the Plant's control (or automation) system and the InReality application. In the illustrated embodiment, this interface is the ArchestrA based global data repository and is supplemented by an interface that uses OPC data and FDT data. Together, these allow real time data to be made available to enterprise applications. The other three sub-interfaces are between the InReality application and the Plant's real-time security system, it's real-time maintenance management system, and it's real-time asset-tracking system—all, by way of example. These sub-interfaces are supported by the ArchestraA, by the corresponding plant system themselves, and/or otherwise.

The second interface, labeled (2), is between the InReality application and the indexed data created by the crawler. In the illustrated embodiment, this is the index that the search engine goes to first, looking to resolve the users query. Such an interface can be adapted to any commercial (or otherwise known) search engine, that allows real time process data to be viewed as if it were an indexed web page with related attributes. The metadata of the file (size, author, date created, key words), is replaced (by way of example) with the metadata of control point, state, alarm condition, description, status, and value. This 'index' interface is updated by the control system as change driven data from the control system. Additionally, there are mechanisms to update the index based either on scheduling or on demand by an application programming interface (API).

The third interface, labeled (3), is between the existing web crawler and the InReality application. All crawlers have their own unique methods of directing how the crawler behaves. These methods are known as policies and address how the crawler determines where to go next. The interface driven by the InReality application and its configuration will control the crawler such that it can be interrupted and redirected in a new direction based on a forcing policy associated with process state, alarm conditions or events.

In operation, users utilizing the human machine interface (HMI) of the illustrated embodiment (depicted here, by way of non-limiting example, as the workstations labeled "Typical Users") post search queries to a web browser (or other) application executing thereon. As noted above, such a browser can execute in the conventional manner known in the art, as adapted in accord with the teachings hereof. Those queries are applied by the search engine against the aforementioned index (e.g., as more fully shown in the drawing) in order to generate links to web pages from the Enterprise and/or Internet (in the conventional manner known in the art), as well as to generate links to and/or real-time displays from real-time automation data (e.g., in accord with the teachings above).

Figure 3:
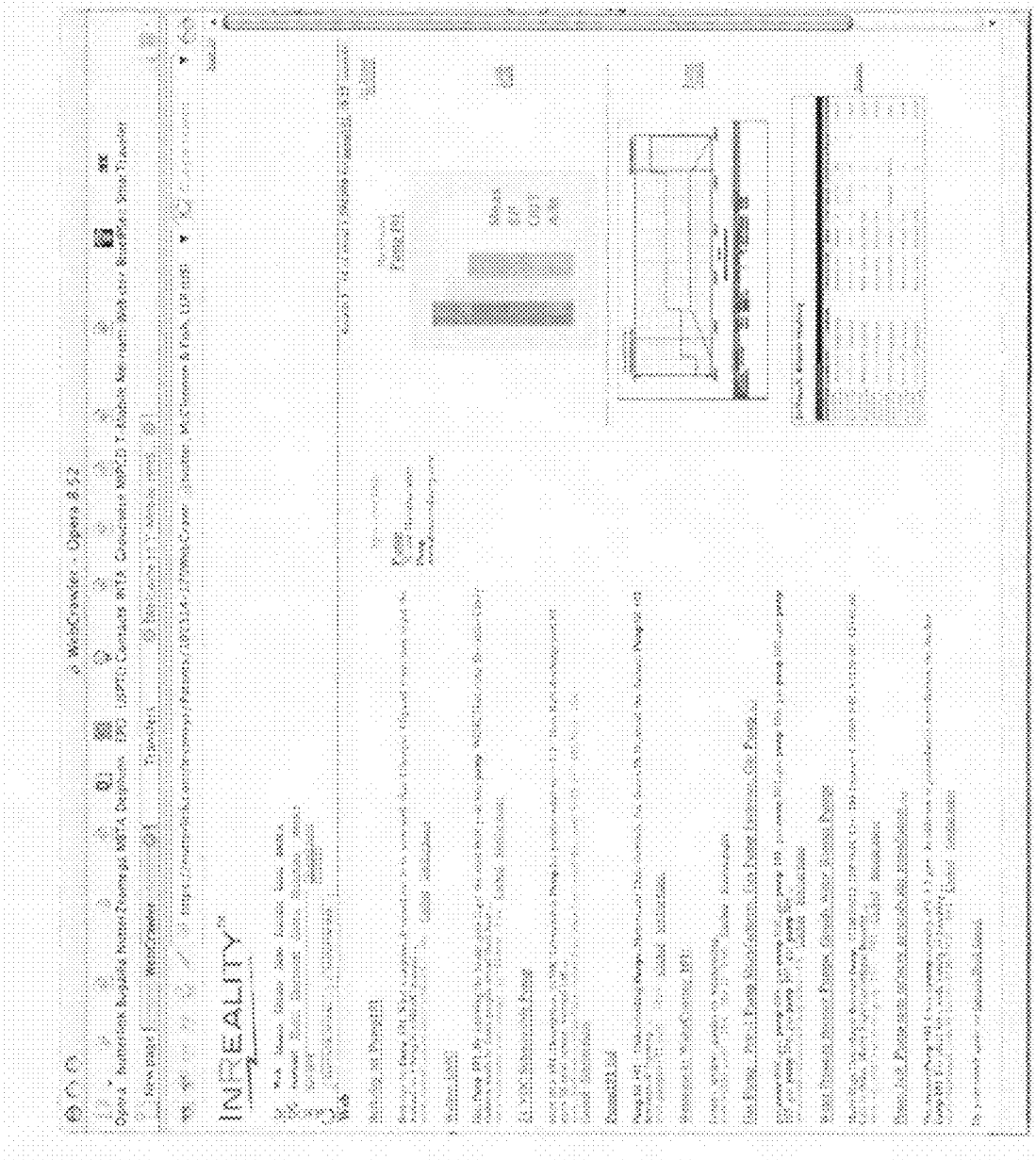
FIGS. 3-5 depict displays generated by a human machine interface according to the invention.
Figure 4:
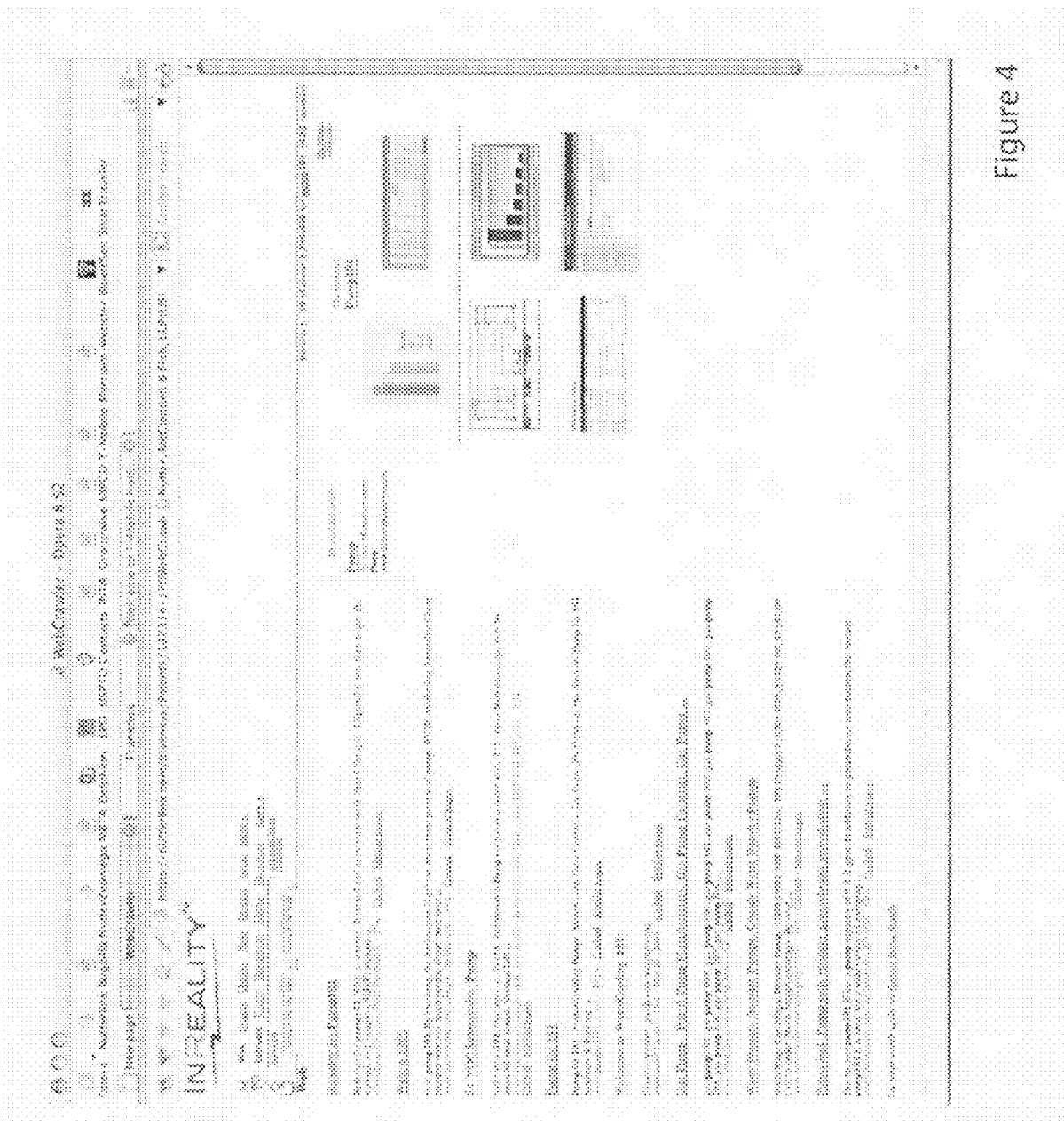
Figure 5:
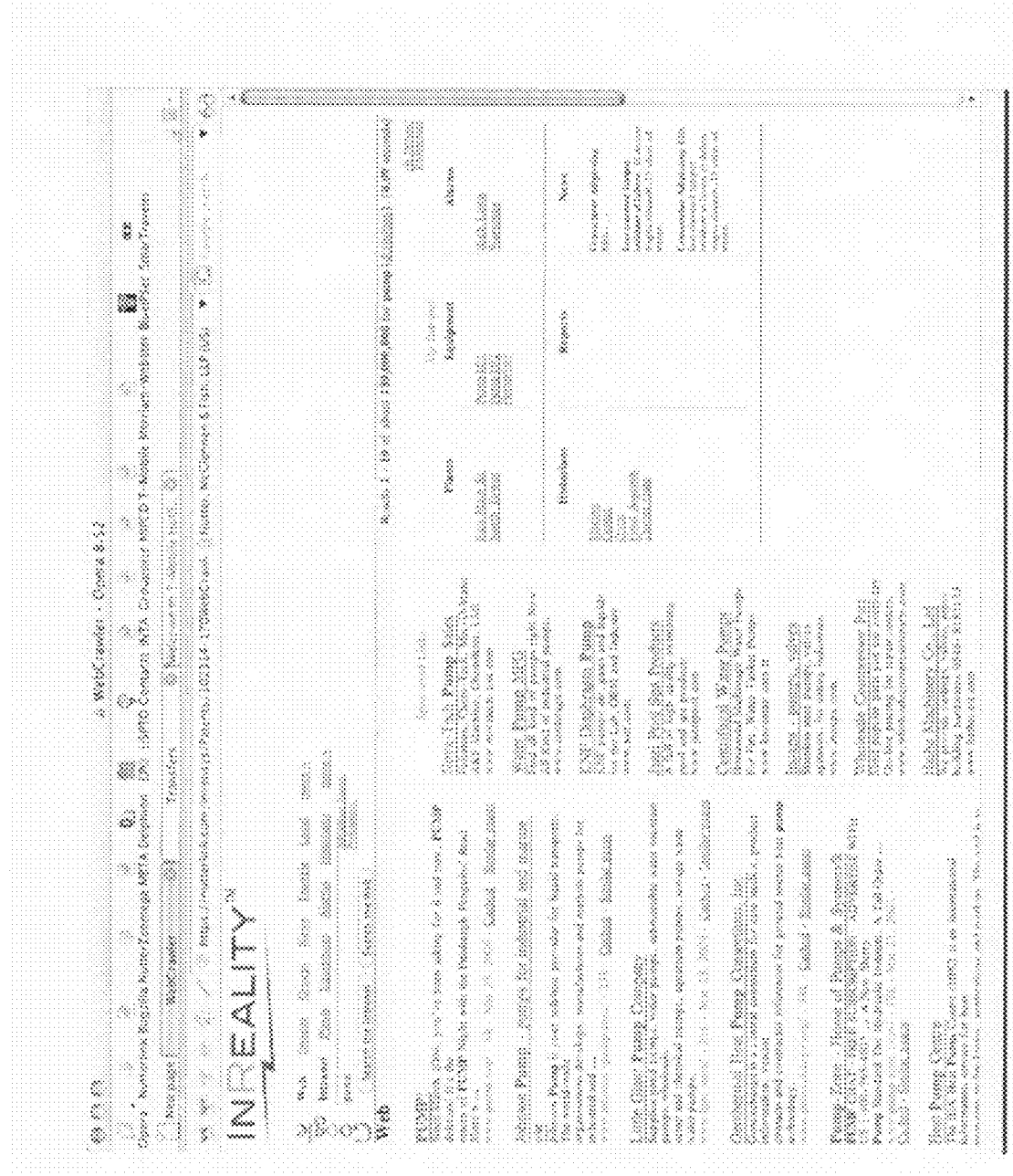

FIGS. 3-5 depict the presentation of such an HMI in a system according to the invention. Specifically, FIG. 3 depicts a three-column presentation generated in response to a user query for "Pump101". The two leftmost columns contain display elements that include links and other information from pages retrieved from the web in the conventional manner known in the art. The rightmost column contains display elements that include real-time graphical displays of automation data from that equipment in the automation system (i.e., the "Plant") associated with the tag "Pump101." FIG. 4 shows a similar such presentation, albeit wherein the rightmost column displays additional graphical automation data from Pump101. It will be appreciated from the foregoing that the display elements generated by the HMI need not be static but, rather, may be interactive—e.g., as in the case of (i) links that respond to user selection by effecting display of web pages that are targeted by the links, and (ii) real-time graphical displays of automaton data that can dynamically convey changing information. It will be appreciated that the foregoing are just examples of the types of information conveyed by the display elements (static, dynamic, or otherwise).

In the illustrated embodiment, a user or system administrator) may configure the HMI for presentation of the displays of FIGS. 3 and 4, among others, utilizing a preference panel, not shown. Such preferences can permit, by way of non-limiting example, selection of specific graphical display panels, as well as specification of types and/or subsets of automation data to be searched.

FIG. 5 depicts a presentation of the type generated by the HMI wherein the rightmost column (by way of example) includes links to—rather than real-time graphical displays based on—automation data from plants, equipment, alarms, historians, and other aspects of the Plant associated with the query term (in this case, for the term "Pump"). Such links can be presented, in addition to or in lieu of graphical displays (e.g., of FIGS. 3-4) where multiple data streams are associated with a given search and/or where so selected by the preferences panel.

As evident upon examination of FIGS. 3-5, the search box of the illustrated browser is supplemented with a "Search Internet" button, in addition to the conventional "Search Web" button. Use of the former permits the user to specifically limit his or her search to real-time automation data and, optionally, other information on the enterprise network (e.g., as determined by the aforementioned preferences panel). Use of the latter combines both a search of the web and of the real-time automation data (and, optionally, other information on the enterprise network).

As will be further evident upon examination of those drawings, above the search box are domain-specific search limiters. Those for web are conventional, e.g., "images," "groups," "news" and so forth. Those for the intranet are unique to the illustrated embodiment. In the illustrated embodiment, these are for categories of real-time data, such as, plants, equipment, alarms, historians, and so forth. Other embodiments may use other categories. Regardless, for each of the categories, the HMI can additionally include a graphical component (such as, by way of non-limiting example, a bar graph) reflecting a number of search "hits" per category.

Microsoft Enterprise Search

Further embodiments of the invention utilize search engine technology based on Microsoft Enterprise Search, as described in further detail below, all by way of non-limiting example. In these embodiments, data content is categorized by "Content Source" which is associated with a Protocol Handler. Out-of-the-box Protocol Handlers provided by Microsoft are available for the following "Content Sources":

WebContentSource—Includes any Web content
    SharePointContentSource—Includes all Windows SharePoint Services content
    FileShareContentSource—Includes all file share content
    ExchangePublicFolderContentSource—Includes all Microsoft® Exchange Server public folder content
    LotusNotesContentSource—Includes all Lotus Notes content. Not configured by default.

These content sources define what type of information will be crawled and indexed. Scopes can be defined that limit queries to a subset of data contained within the indexed content of a Sharepoint Server.

The system uses a pull-based model, not a push-model. This can limit scalability and performance with respect to refresh latencies. In order to reduce latencies, an incremental crawling technique implemented within the Microsoft technology allows more efficient and therefore shorter crawl cycles to be used. In embodiments of the invention wherein incremental crawling is leveraged, then latencies of 10-15 minutes may be achievable. While this may not be considered "real-time" data, it falls well within the timing requirements of configuration metadata as well as hour-average process data. Access to real-time process data is handled through standard API mechanisms once a tag reference of interest has been identified through query.

A push-model based on incremental, change-driven eventing, as may be implemented in connection with future versions of Microsoft Search, is beneficial in reducing data update latencies.

The relative ranking of information returned from a query is controlled by link analysis but can also be affected by tuning property weights and query weights.

Two mechanisms are exposed for client access to the query engine:
    Web Service for remote access
    .NET Managed Query Object Model for local access
    Two types of queries are supported:
    Keyword
    SQL Basic Schema Concepts Information is referenced in the form of properties. Two types of properties exist: 1) Crawled Properties and 2) Managed Properties. Crawled Properties are discovered from the crawled content and Managed Properties are defined by an administrator. A mapping is then defined that associates these two properties for purposes of query and display.

Properties have names and may be single valued or multi-valued. In addition, property access is intended to be read-only. If update is required, then business objects should be used to control access and provide validation.

System Deployment Topology

Figure 6:
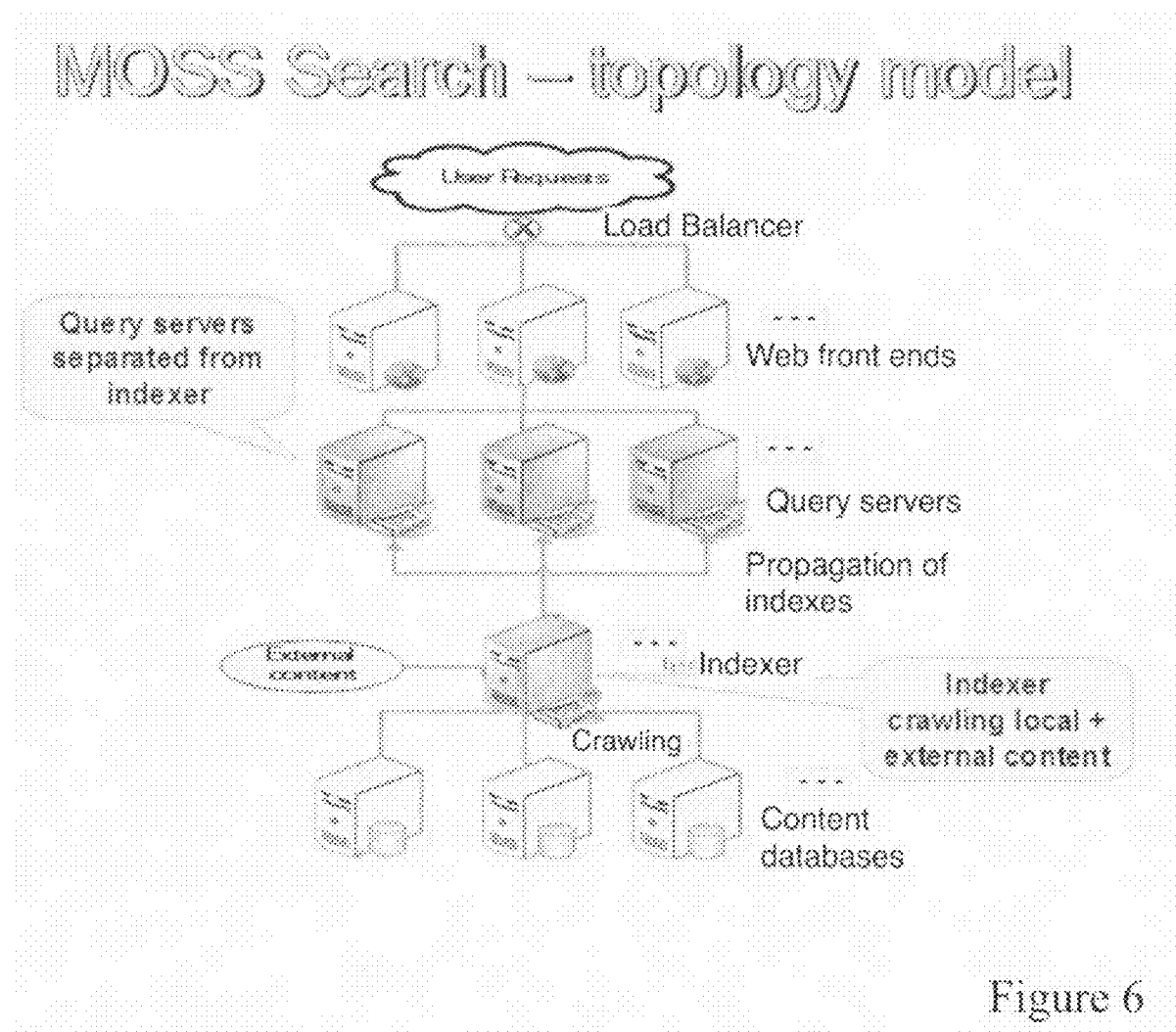
FIG. 6 illustrates a multi-tier architecture using web server front-ends, application servers running the query servers being fed by an indexing server which crawls database and web service content.

FIG. 6 illustrates a typical multi-tier architecture using web server front-ends, application servers running the query servers being fed by an indexing server which crawls database and web service content.

Technical Overview

Figure 7:
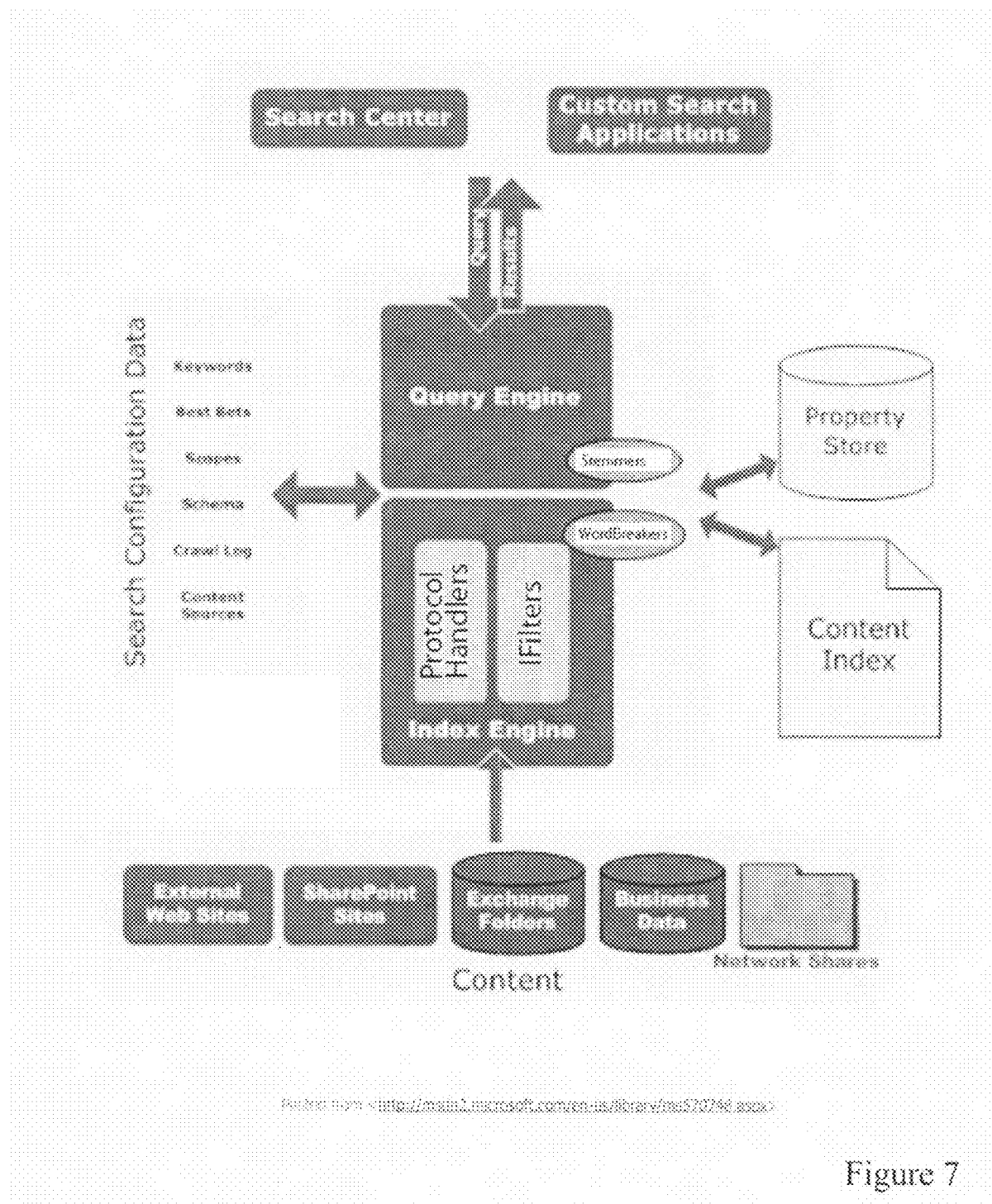
FIG. 7 provides a detailed view of a search service internal architecture.

FIG. 7 provides a detailed view of the Search service internal architecture.

Following are the components of the Search service's architecture:
    Index Engine—Processes the chunks of text and properties filtered from content sources, storing them in the content index and property store.

Query Engine—Executes keyword and SQL syntax queries against the content index and search configuration data.

Protocol Handlers—Opens content sources in their native protocols and exposes documents and other items to be filtered.

IFilters—Opens documents and other content source items in their native formats and filters into chunks of text and properties.

Content Index—Stores information about words and their location in a content item.

Property Store—Stores a table of properties and associated values.

Search Configuration Data—Stores information used by the Search service, including crawl configuration, property schema, scopes, and so on.

Wordbreakers—Used by the query and index engines to break compound words and phrases into individual words or tokens.

Integration of External Data Repositories

The following techniques are available to integrate external data repositories:

CustomContentSource—Used to create custom content source. These content sources require the development of COM objects that implement the ISearchProtocol, IUrlAccessor and IFilter interfaces. These objects can be built using either native or managed .NET code but only native objects using ATL have been built to date.

Business Data Content Source—This special content source is supplied as part of the Microsoft Office Sharepoint Server 2007 Enterprise (e.g. MOSS Enterprise). The Business Data Catalog (e.g. BDC) acts as an adapter for access to ADO.NET data sources (e.g. SQLServer) and Web Services. Data returned by the ADO.NET or Web Service may be in the form of XML or a .NET Dataset. If information is accessible using either of these techniques, then the BDC provides a very attractive integration mechanism. Information residing in the BDC is maintained and queried as a list of properties. These properties are defined using an XML file which could be generated programmatically.

Business Data Catalog

Business Data Catalog comprises a metadata database and an object model that provides a simple, consistent, object-oriented programming interface for business logic that lives in the various business applications.

Figure 8:
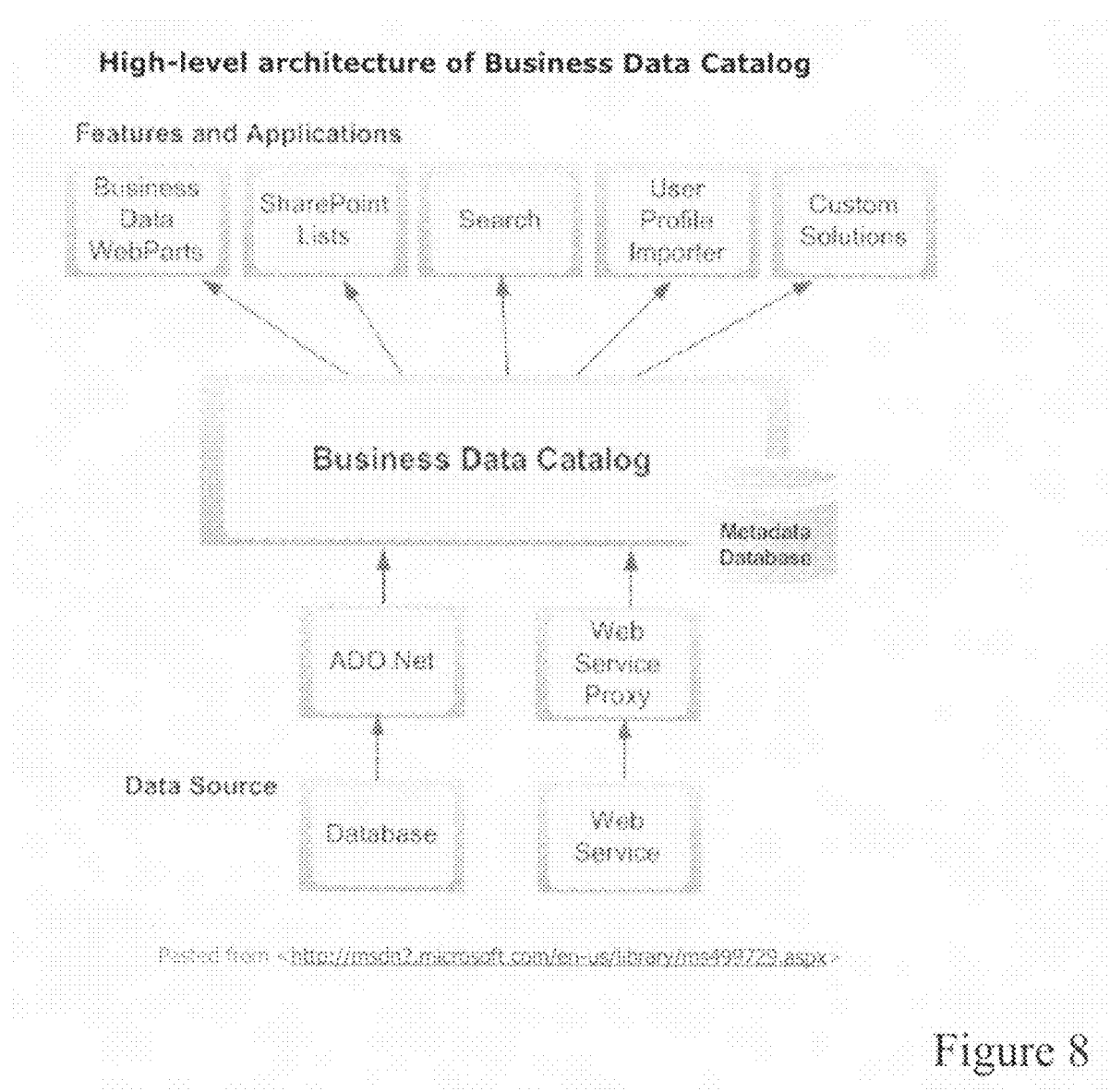
FIG. 8 is a high-level architecture diagram of a business data catalog showing the interaction between business data sources, the metadata database, and business data features and solutions.

FIG. 8 is a high-level architecture diagram of Business Data Catalog showing the interaction between business data sources, the metadata database, and business data features and solutions.

Figure 9:
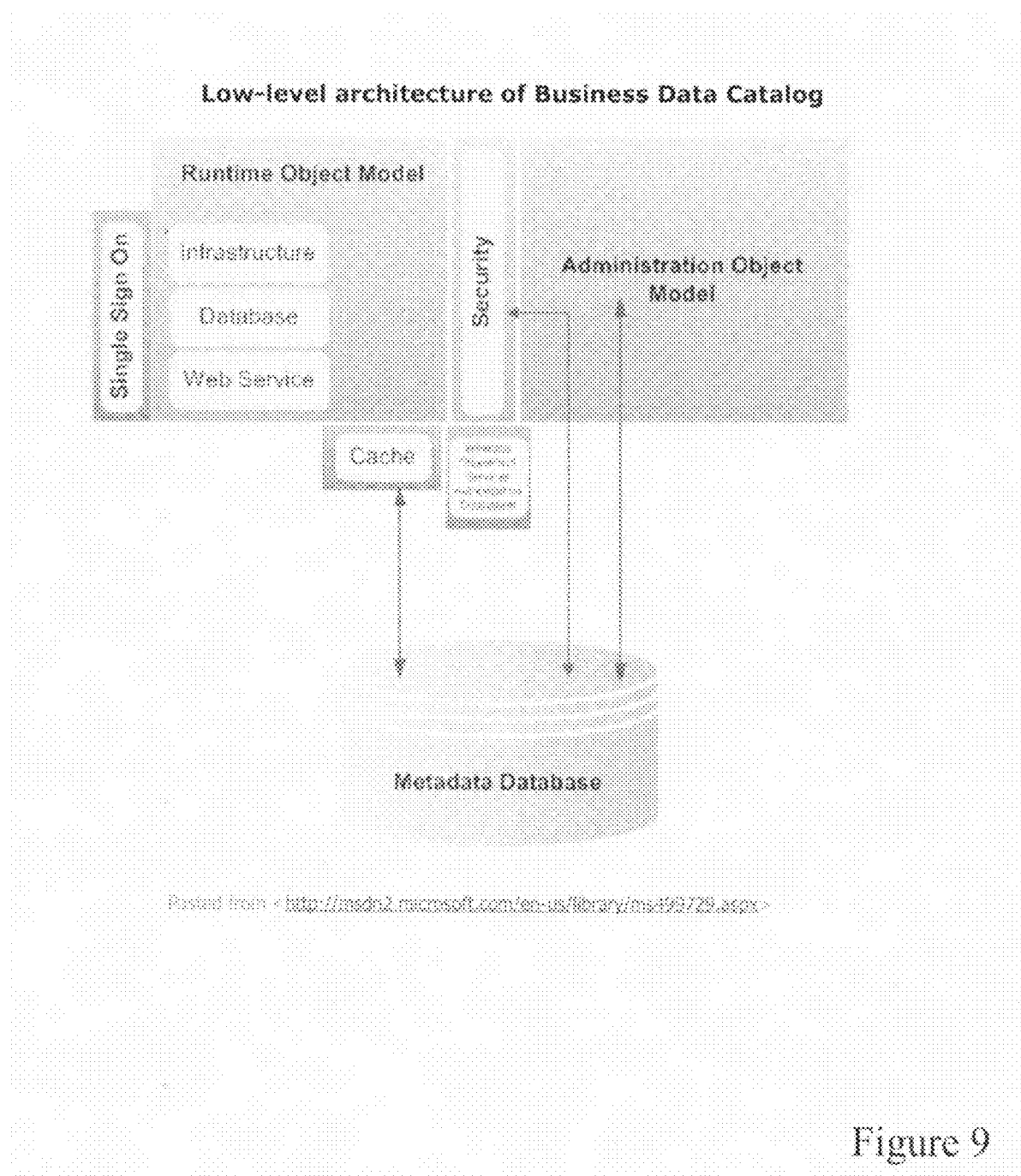
FIG. 9 shows a low-level architecture of a business data catalog, including the interaction between the metadata database and the runtime and administration object models.

FIG. 9 shows the low-level architecture of Business Data Catalog, including the interaction between the metadata database and the Runtime and Administration object models.

Manufacturing Information Content

Document-centric information valuable to the operation and management of industrial processes is indexed using standard content source types:

Process Reports
Process Shift and Hourly Logs
Operating Instructions
Operations Manuals
Material Safety Data Sheets
Instrument Specifications
Intranet Websites
Equipment Engineering Specifications
Engineering Drawings (using attribute extraction to text)
Process Engineering Documents
Etc. . . .

If these documents are currently available only through a document management system, then either they can be 1) replicated to a read-only network share or website, such as Sharepoint, or 2) a custom protocol handler could be built to provide direct access to the document management system.

Interesting properties might include such plant entities as equipment, strategy/loop, pipeline, instrument, area, etc.

Information contained within the control system configuration database is crawled and indexed using an appropriate technique such as:

ADO.NET, if the configuration is maintained within a standard database schema.

Custom Web Service built to wrap a custom API. This might apply to ArchestrA and the GRAccess API or to the InFusion IEE API.

Standard Content Sources, if the configuration database can be extracted into a series of documents that represent the configuration objects using a reporting or export capability.

The user can query and navigate the indexed documents, as desired, using standard Sharepoint user interface (e.g. UI) tools. A custom UI, built using a web part, allows the user to access the manufacturing and control systems applications directly, based upon query results returned. This provides a very utilitarian interface, especially for casual users. As crawler efficiency improves, more and more dynamic process information can be included in the indexed content.

By way of example, an enterprise environment in which a system according to the invention operates can include data repositories such as, e.g., equipment databases, manufacturing databases, and batch processing databases, of the type known in the art (as adapted in accord with the teachings hereof). These databases, which can exist in lieu of, or in addition to, the aforementioned ArchestrA™ based global data repository discussed above, are merely additional examples of the data repositories with which systems and methods according to the invention operate.

In operation, a user utilizing human machine interface (HMI) methods and apparatus according to the invention can obtain information regarding a process attribute, such as a process control equipment tag "SC100" (by way of non-limiting example), by posting a query to a web browser as discussed above. As further discussed above, such a query is applied to the search engine in order to generate links to and/or real-time displays from real-time automation data for the enterprise, as well as links to web pages internal to the enterprise (including, for example, pages conveying information from the aforementioned equipment, manufacturing, and batch processing databases) and to web pages on the Internet.

To this end, links and/or other information pertaining to the enterprise can be obtained via interface(s) of the type described above, e.g., to the search engine API, that provide dynamic automation data in a dynamically updating table. Alternatively, or in addition, such links and/or other information can be obtained via use of Microsoft Enterprise Search (or related technologies) in enterprises whose infrastructures are so suited. In any event, it will be appreciated that methods and apparatus constructed in accord with the teachings hereof identify and aggregate, e.g., via display on the user's browser, the aforementioned links and other information regarding the requested process attribute (here, tag "SC100")—regardless of whether it is contained in a single enterprise database or distributed throughout several non-integrated or disconnected databases.

Described above are systems and their methods of operation meeting the objects set forth earlier. Those skilled in the art will appreciate that the embodiments presented herein are merely examples of the invention and that other embodiments, incorporating changes thereto, fall within the scope of the invention. Thus, by way of non-limiting example, it will be appreciated that the specific arrangement of the presentations of FIGS. 3-5 is merely by way of example and shall not be construed to limit the invention.

In view of the foregoing, what we claim is:

1. A digital data processing system comprising,
   A. a web crawler search engine for indexing any of
      (i) plant automation data, and
      (ii) real-time automation data,
      in an enterprise,
   B. a web browser for execution on a first digital data processor and in communications coupling with (i) the web crawler search engine, and (ii) a public network,
   C. the web browser permitting a user to any of search and view (i) pages on the public network concurrently with (ii) any of said plant automation data and real-time automation data, by responding to a user query by generating and displaying
      (i) one or more interface regions comprising links to web pages from the public network, and
      (ii) one or more interface regions comprising any of (a) links to and (b) displays of any of said plant automation data and said real-time automation data indexed by the web crawler search engine.

2. The digital data processing system of claim 1, wherein the web crawler search engine collects any of said plant automation data and said real-time automation data.

3. The digital data processing system of claim 2, wherein the web crawler search engine indexes one or more pages of the public network.

4. The digital data processing system of claim 2, wherein any of the plant automation data, the real-time automation data, the FDT data, and the OPC data is input into the web crawler with metadata for any of control point, state, alarm condition, description, status, and value.

5. The digital data processing system of claim 1, wherein any of the first digital data processor and another digital data processor transfers any of said plant automation data and said real-time automation data from a repository to the web crawler search engine for indexing.

6. The digital data processing system of claim 5, wherein any of said first digital data processor and said other digital data processor transfers field device tool (FDT) data and/or object linking and embedding for process control (OPC) data to the web crawler for such indexing.

7. The digital data processing system of claim 6, wherein such transfers are effected by presenting any of the plant automation data, the real-time automation data, the FDT data and the OPC data to the web crawler as if that data were web pages with related attributes.

8. The digital data processing system of claim 7, wherein the transfers are effected by an interface that updates any of the plant automation data, the real-time automation data, the FDT data and the OPC data indexed by the web crawler as change driven data.

9. The digital data processing system of claim 5, wherein the index is updated based on a schedule and/or a demand by an application programming interface (API).

10. The digital data processing system of claim 1, comprising one or more policies that direct behavior of the web crawler, wherein one or more of those policies are controlled such that the web crawler search engine can be interrupted and redirected in a new direction based on a forcing policy associated with any of process state, alarm conditions or events.

11. The digital data processing system of claim 1, wherein the web browser is configured to respond to a user query comprising a tag associated with equipment.

12. The digital data processing system of claim 11, wherein the web browser is configured to respond to the user query by displaying automation data from equipment associated with the tag and/or information regarding the tag.

13. The digital data processing system of claim 1, wherein the web browser permits a user to apply thereto a user query that returns a list with one or more instrument tagnames.

14. A digital data processing system comprising,
   a web crawler search engine for execution on a first digital data processor,
   the web crawler search engine configured to collect and index any of plant automation data and real-time automation data from within a plant,
   the web crawler search engine also being configured to collect and index any of (i) one or more pages of an Internet or (ii) one or more pages of a wide area network, local area network, and/or other enterprise network,
   said collecting and indexing by the web crawler search engine enabling a web browser to respond to a user query by generating and displaying
      (i) one or more interface regions comprising any of (a) links to and (b) displays of any of said plant automation data and said real-time automation data indexed by the web crawler search engine, and
      (ii) one or more interface regions comprising one or more pages indexed by the web crawler search engine from the Internet, wide area network, local area network, and/or other enterprise network, other than plant and/or real-time automation data.

15. The digital data processing system of claim 14, wherein the index is updated based on a schedule and/or a demand by an application programming interface (API).

16. The digital data processing system of claim 14, wherein said any of plant automation data and said real-time automation data is received by the web crawler with metadata for any of control point, state, alarm condition, description, status, and value.

17. The digital data processing system of claim 14, wherein one or more other digital data processors transfers any of said plant automation data and said real-time automation data from a repository to the web crawler.

18. The digital data processing system of claim 17, wherein the one or more other digital data processors transfers field device tool (FDT) data and/or object linking and embedding for process control (OPC) data to the web crawler for such indexing.

19. The digital data processing system of claim 18, wherein the transfers are effected by an interface that updates any of the plant automation data, the real-time automation data, the FDT data and/or the OPC data indexed by the web crawler as change driven data.

20. The digital data processing system of claim 17, wherein such transfers are effected by presenting any of the plant automation data, the real-time automation data, the FDT data, and the OPC data to the web crawler as if that data were web pages with related attributes.

21. The digital data processing system of claim 14, comprising one or more policies that direct behavior of the web crawler search engine, wherein the policies are controlled such that the web crawler search engine can be interrupted and redirected in a new direction based on a forcing policy associated with any of process state, alarm conditions or events.

22. The digital data processing system of claim 14, wherein said collecting and indexing by the web crawler search engine enables the web browser to respond to a user query comprising a tag associated with equipment.

23. The digital data processing system of claim 22, wherein said collecting and indexing by the web crawler search engine enables the web browser to respond to the user query by displaying automation data from equipment associated with the tag and/or information regarding the tag.

24. The digital data processing system of claim 14, wherein the web browser permits a user to apply thereto a user query that returns a list with one or more instrument tagnames.

25. A digital data processing system comprising,
   A. a web browser for execution on a first digital data processor,
   B. the web browser configured to respond to a user query by generating and displaying
      (i) one or more interface regions comprising any of (a) links to and (b) displays of any of plant automation data and real-time automation data, and
      (ii) one or more other interface regions comprising one or more pages indexed by the web crawler search engine from any of an Internet, wide area network, local area network, and/or other enterprise network, other than plant and/or real-time automation data
   C. a web crawler search engine for execution on a second digital data processor that is in communications coupling with the first digital data processor,
   D. the web crawler search engine configured to collect and index any of plant automation data and real-time automation data transferred from a repository of automation data for such display and query by users.

26. The digital data processing system of claim 25, wherein the one or more other interface regions comprises one or more aspects of business data maintained on the wide area network, local area network and/or other enterprise network.

27. The digital data processing system of claim 25, wherein the web crawler search engine is configured to index one or more pages of the Internet, wide area network, local area network and/or other enterprise network.

28. The digital data processing system of claim 25, wherein a digital data processor is configured to transfer field device tool (FDT) data and/or object linking and embedding for process control (OPC) data to the web crawler for such indexing.

29. The digital data processing system of claim 28, wherein such transfers are effected by presenting the plant automation data, the real-time process automation data, the FDT data and/or the OPC data to the web crawler as if that data were web pages with related attributes.

30. The digital data processing system of claim 25, wherein such data is input into the web crawler with metadata for any of control point, state, alarm condition, description, status, and value.

31. The digital data processing system of claim 30, wherein the transfers are effected by an interface that updates the plant automation data, the real-time automation data, the FDT data and/or the OPC data indexed by the web crawler as change driven data.

32. The digital data processing system of claim 25, wherein the index is updated based on a schedule and/or a demand by an application programming interface (API).

33. The digital data processing system of claim 25, comprising one or more policies that direct behavior of the web crawler search engine, the policies controlled such that the web crawler search engine can be interrupted and redirected in a new direction based on a forcing policy associated with any of process state, alarm conditions or events.

34. The digital data processing system of claim 25, wherein the web browser is configured to respond to a user query comprising a tag associated with equipment.

35. The digital data processing system of claim 34, wherein the web browser is configured to respond to the user query by displaying automation data from equipment associated with the tag and/or information regarding the tag.

36. The digital data processing system of claim 25, wherein the web browser permits a user to apply thereto a user query that returns a list with one or more instrument tagnames.

* * * * *